(12) United States Patent
Silverbrook

(10) Patent No.: US 7,448,734 B2
(45) Date of Patent: Nov. 11, 2008

(54) INKJET PRINTER CARTRIDGE WITH PAGEWIDTH PRINTHEAD

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 223 days.

(21) Appl. No.: 10/760,254

(22) Filed: Jan. 21, 2004

(65) Prior Publication Data
US 2005/0157061 A1 Jul. 21, 2005

(51) Int. Cl.
B41J 2/175 (2006.01)
(52) U.S. Cl. .......................... 347/85; 347/42
(58) Field of Classification Search .................. 347/85, 347/42
See application file for complete search history.

(56) References Cited

U.S. PATENT DOCUMENTS

| | | |
|---|---|---|
| 4,985,710 A | 1/1991 | Drake |
| 5,160,945 A | 11/1992 | Drake |
| 5,221,397 A | 6/1993 | Nystrom |
| 6,017,117 A | 1/2000 | Mc Clelland et al. |
| 6,270,177 B1 | 8/2001 | King et al. |
| 6,281,912 B1* | 8/2001 | Silverbrook ................. 347/42 |
| 6,382,769 B1 | 5/2002 | Silverbrook |
| 6,439,908 B1* | 8/2002 | Silverbrook et al. ......... 439/212 |
| 6,443,555 B1* | 9/2002 | Silverbrook et al. .......... 347/42 |
| 6,554,398 B2 | 4/2003 | Wyangaert et al. |
| 6,557,976 B2* | 5/2003 | McElfresh et al. ............ 347/50 |
| 6,652,082 B2 | 11/2003 | Silverbrook |
| 6,672,706 B2 | 1/2004 | Silverbrook |
| 6,679,584 B2 | 1/2004 | Silverbrook |

FOREIGN PATENT DOCUMENTS

WO  WO 03/086770 A1  10/2003

* cited by examiner

Primary Examiner—Manish S. Shah
Assistant Examiner—Laura E Martin

(57) ABSTRACT

A printer cartridge for an inkjet printer including a printing fluid storage and a pagewidth printhead in communication with said printing fluid storage.

16 Claims, 36 Drawing Sheets

INKJET PRINTER CARTRIDGE WITH PAGEWIDTH PRINTHEAD

FIELD OF THE INVENTION

The present invention relates to a printer system and in particular to a removable printer cartridge for an inkjet printer system.

CROSS-REFERENCE TO CO-PENDING APPLICATIONS

The following applications have been filed by the Applicant simultaneously with the present application:

| | | | | | |
|---|---|---|---|---|---|
| 10/760272 | 10/760273 | 7083271 | 10/760182 | 7080894 | 10/760218 |
| 7090336 | 10/760216 | 10/760233 | 10/760246 | 7083257 | 10/760243 |
| 10/760201 | 10/760185 | 10/760253 | 10/760255 | 10/760209 | 7118192 |
| 10/760194 | 10/760238 | 7077505 | 10/760235 | 7077504 | 10/760189 |
| 10/760262 | 10/760232 | 10/760231 | 10/760200 | 10/760190 | 10/760191 |
| 10/760227 | 7108353 | 7104629 | 10/760210 | 10/760202 | 10/760197 |
| 10/760198 | 10/760249 | 10/760263 | 10/760196 | 10/760247 | 10/760223 |
| 10/760264 | 10/760244 | 7097291 | 10/760222 | 10/760248 | 7083273 |
| 10/760192 | 10/760203 | 10/760204 | 10/760205 | 10/760206 | 10/760267 |
| 10/760270 | 10/760259 | 10/760271 | 10/760275 | 10/760274 | 7121655 |
| 10/760184 | 10/760195 | 10/760186 | 10/760261 | 7083272 | 10/760180 |
| 7111935 | 10/760213 | 10/760219 | 10/760237 | 10/760221 | 10/760220 |
| 7002664 | 10/760252 | 10/760265 | 10/760230 | 10/760225 | 10/760224 |
| 6991098 | 10/760228 | 694970 | 10/760215 | 7108434 | 10/760257 |
| 10/760240 | 10/760251 | 10/760266 | 6920704 | 10/760193 | 10/760214 |
| 10/760260 | 10/760226 | 10/760269 | 10/760199 | 10/760241 | |

The disclosures of these co-pending applications are incorporated herein by reference.

BACKGROUND OF THE INVENTION

Traditionally, most commercially available inkjet printers employ a printhead that traverse back and forth across the width of the print media as it prints. Such a print head is supplied with ink for printing and typically has a finite life, after which replacement of the printhead is necessary. Due to the size and configuration of the traversing printhead, removal and replacement of this element is relatively easy, and the printer unit is designed to enable easy access to this element. Whilst printer systems employing such traditional traversing printheads have proven capable of performing printing tasks to a sufficient quality, as the printhead must continually traverse the stationary print media, such systems are typically slow, particularly when used to perform print jobs of photo quality.

Recently, it has been possible to provide printheads that extend the entire width of the print media so that the printhead remains stationary as the print media progresses past. Such printheads are typically referred to as pagewidth printheads, and as the printhead does not move back and forth across the print media, much higher printing speeds are possible with this printhead than with traditionally traversing printheads. However as the printhead is the length of the print media, it must be supported within the structure of the printer unit and requires multiple electrical contacts to deliver power and data to drive the printhead, and as such removal and replacement of the printhead is not as easy as with traditional traversing printheads.

Accordingly, there is a need to provide a printer system that is capable of providing high quality print jobs at high speeds and which facilitates relatively easy replacement of the printhead when necessary.

SUMMARY OF THE INVENTION

Accordingly, in one embodiment of the present invention, there is provided a printer cartridge for an inkjet printer including:

a printing fluid storage; and a pagewidth printhead in communication with said printing fluid storage.

The pagewidth printhead may be arranged to generate a print of at least 8 inches in width and may include at least 20,000 printing fluid delivery nozzles in fluid communication with the printing fluid storage.

The printing fluid storage may be housed within a body that includes an arrangement for replenishing of printing fluid from an external source and may include one or more storage reservoirs for storing ink for printing. The storage reservoirs may separately store a set of colored inks sufficient for color printing as well as an ink fixative to aid in fixing the ink delivered by the pagewidth printhead and an infra-red ink to allow printing to occur in the non-visible spectrum as some applications may require.

The printer cartridge may include a first electrical connector provided in electrical communication with the pagewidth printhead and disposed adjacent a first end of the pagewidth printhead for mating with a first corresponding connector of the inkjet printer. A second electrical connector may also be provided in electrical communication with the pagewidth printhead and disposed adjacent a second end of the pagewidth printhead for mating with a second corresponding connector of the inkjet printer. In such an arrangement, when the printer cartridge is received in the inkjet printer, power and data can transmitted to the pagewidth printhead from the inkjet printer by the mating relationship between the first and second electrical connectors and the corresponding connectors of the inkjet printer.

The printer cartridge may also include an assembly arranged to direct air over the printhead to prevent paper or dust from settling on the fluid delivery nozzles and degrading the print quality of the print job. The assembly may include a filter for filtering the air prior to the air being directed over the printhead, thereby removing any particles that may be entrained in the delivered air. The assembly may also include an inlet for receiving air from an external source, such as a source located in the inkjet printer.

It will be appreciated that the present invention provides a printer system that employs a pagewidth printhead and associated printing fluid storage in a cartridge form which can be readily removed and replaced from a printer unit. Such an arrangement makes it possible to provide a printer system that is capable of providing high quality print jobs at high speeds and which facilitates easy removal and replacement of the printhead where necessary.

DETAILED DESCRIPTION OF PREFERRED EMBODIMENTS

Figure 1:
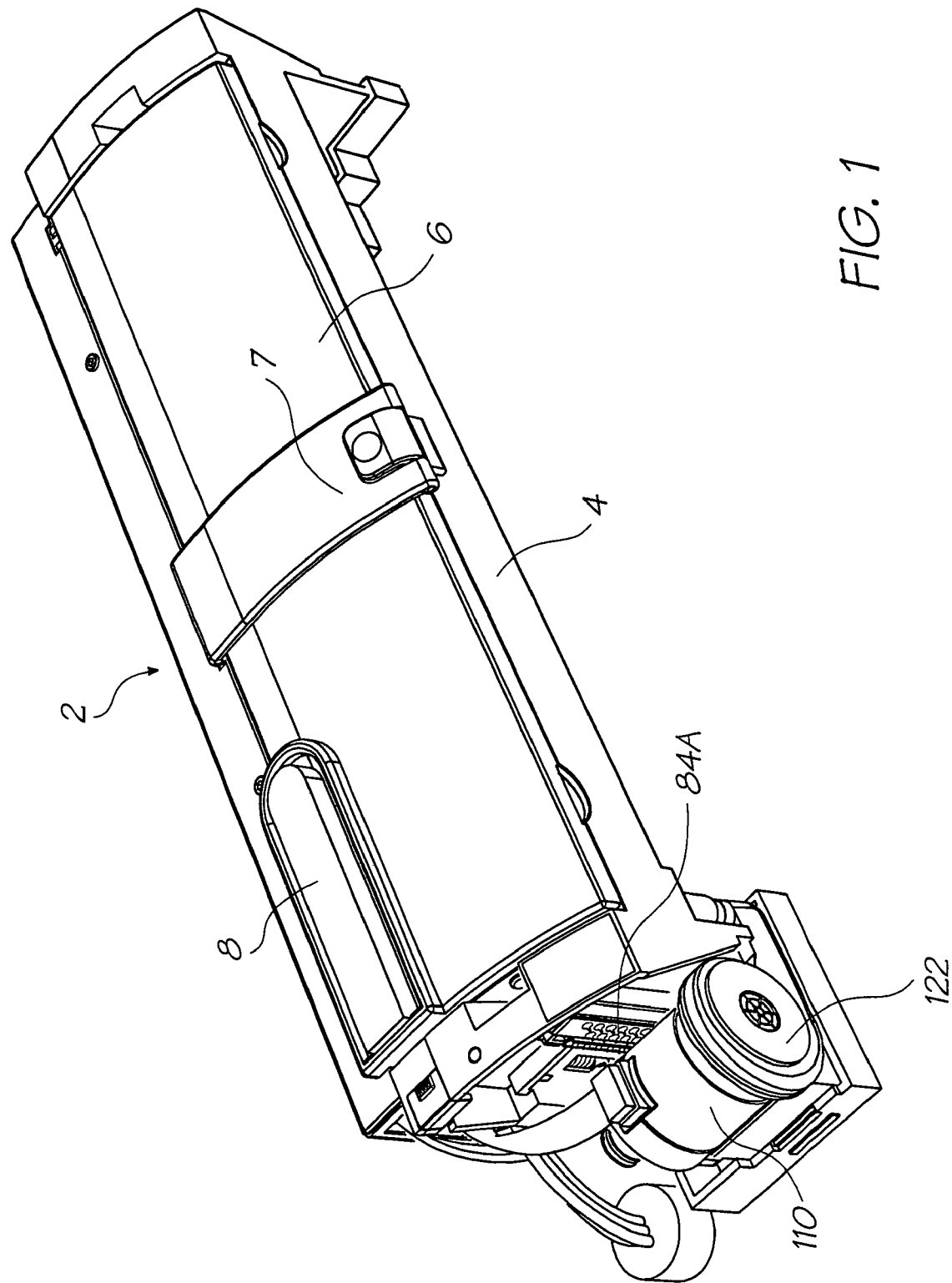
FIG. 1 is a perspective view, showing front, top and right-hand sides of a printer cartridge according to a preferred embodiment of the present invention in combination with a printer cradle.

FIG. 1 depicts an inkjet printer 2 which includes a cradle 4 that receives a replaceable print cartridge 6 into a recess formed in the cradle's body according to a preferred embodiment of the present invention. Cartridge 6 is secured in the cradle recess by a retainer in the form of latch 7 that is connected by a hinge to cradle 4. Visible on the upper surface of print cartridge 6 is an ink refill port 8 which receives an ink refill cartridge during use.

Print Cartridge

Figure 2:
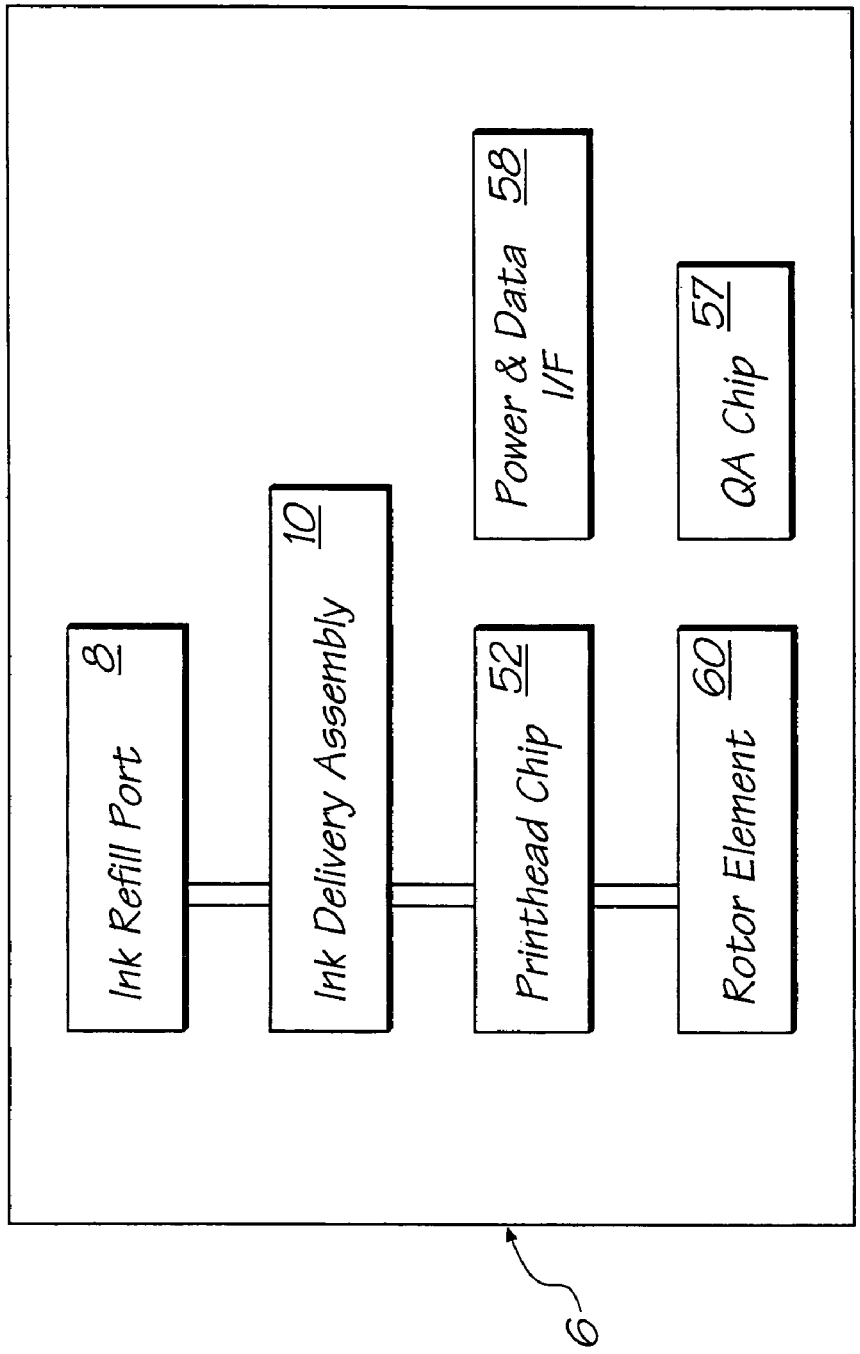
FIG. 2 is a block diagram of the printer cartridge.
Figure 4:
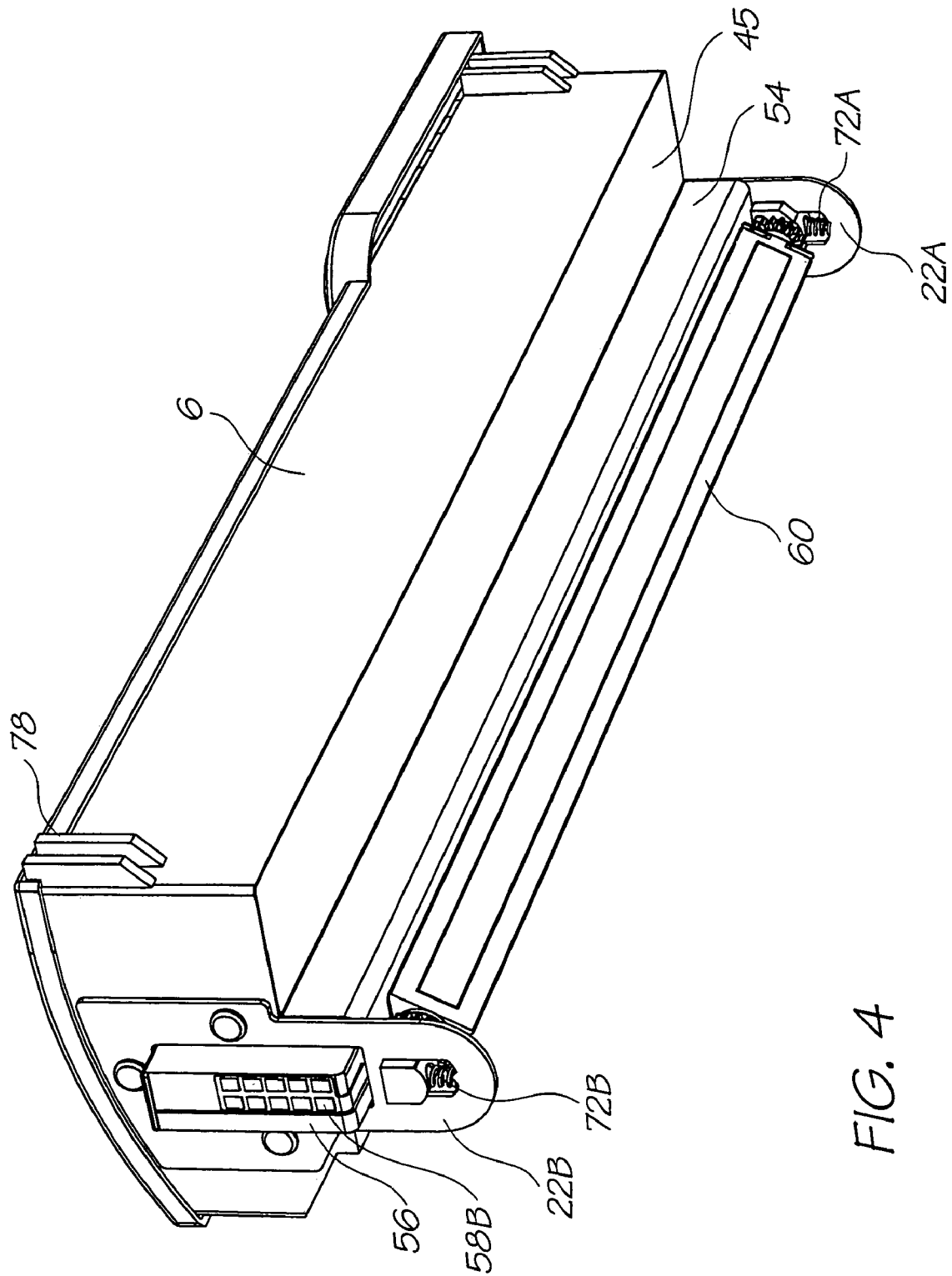
FIG. 4 is a perspective view, showing rear, bottom and left-hand sides of the printer cartridge.
Figure 5:
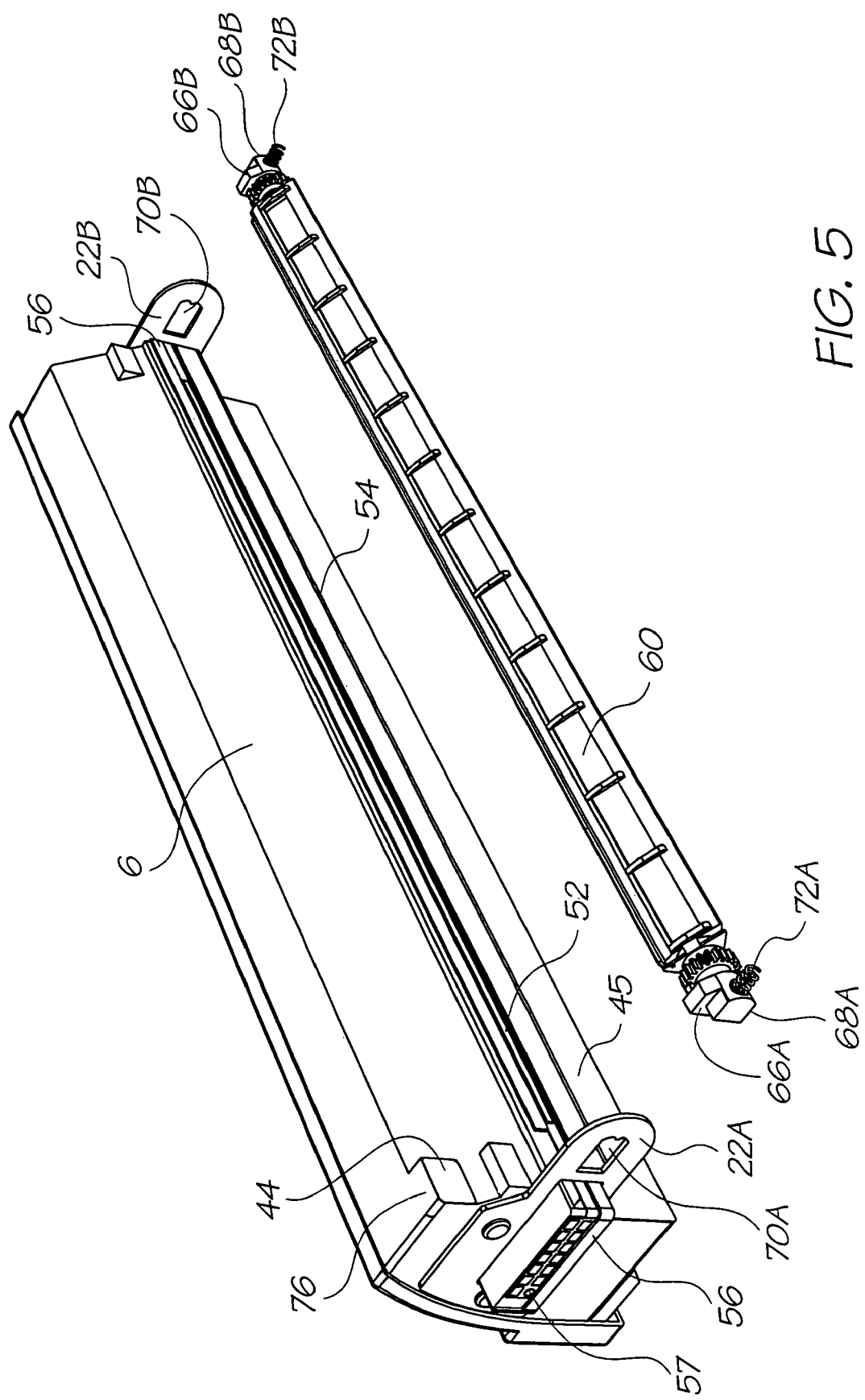
FIG. 5 is a perspective view, showing, front, bottom and right-hand, sides of the printer cartridge in a partly dismantled state.

Referring now to FIG. 2, there is depicted a block diagram of removable inkjet printer cartridge 6. Cartridge 6 includes ink refill port 8 and an ink delivery assembly 10 for storing and delivering ink to a micro-electromechanical pagewidth print head chip 52. Printhead chip 52 receives power and data signals from cradle 4 (see FIG. 4) via power and data interface 58. A rotor element 60, which is mechanically driven by cradle 4 has three faces which respectively serve to: blot printhead chip 52 subsequent to ink ejection; seal the printhead when it is not in use; and act as a platen during printing. Accordingly, rotor element 60 acts as an auxiliary assembly to the printhead in that it assists in maintaining proper printhead functioning. Cartridge 6 also includes an authentication device in the form of quality assurance chip 57 which contains various manufacturer codes that are read by electronic circuitry of controller board 82 of cradle during use. The manufacturer codes are read to verify the authenticity of cartridge 6.

Figure 6:
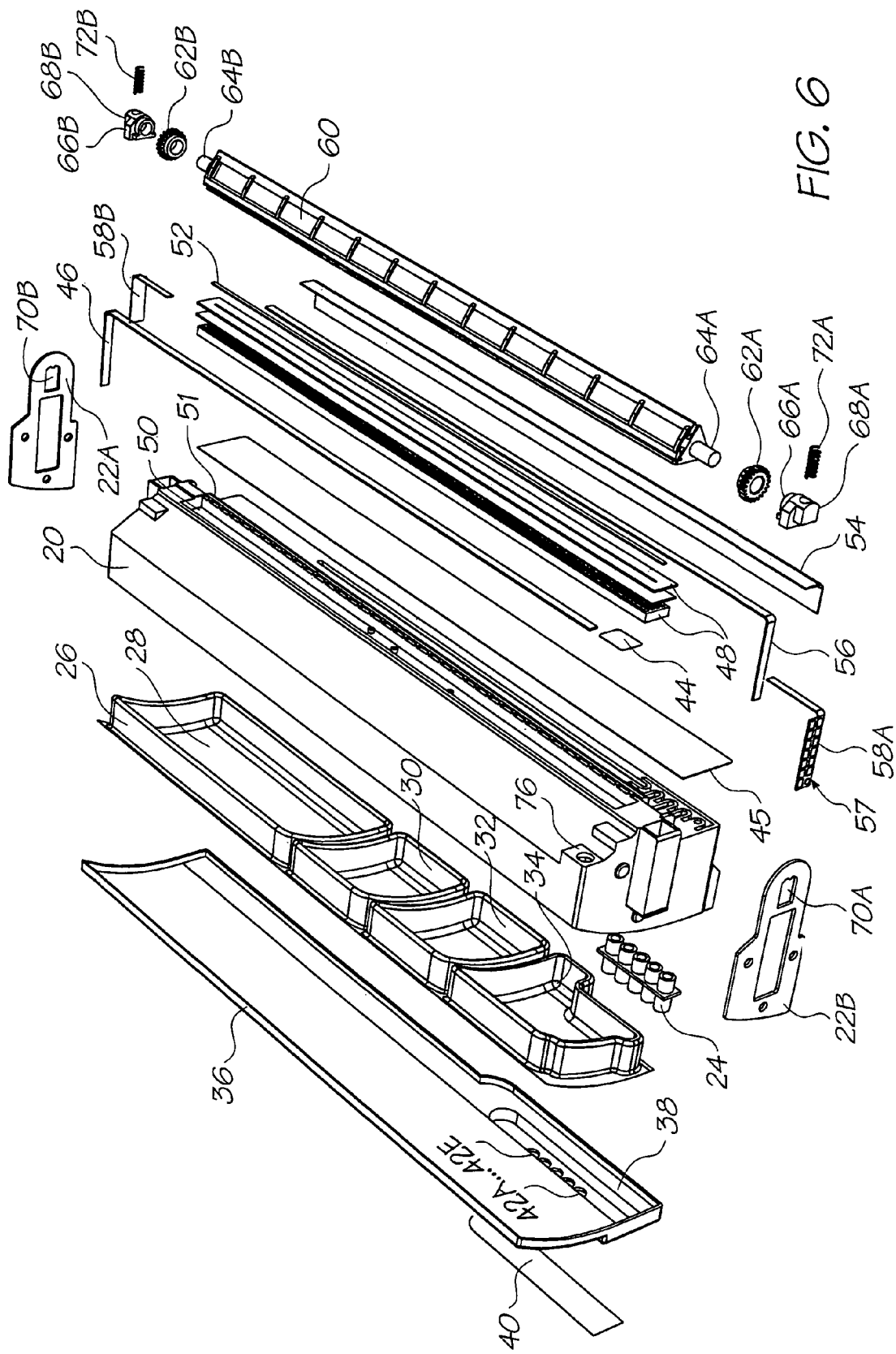
FIG. 6 is a perspective view, showing front, bottom and right-hand sides of the printer cartridge in an exploded state.

With reference to FIGS. 3 to 9, and initially to FIG. 6, structurally cartridge 6 has a body including a base molding 20 that houses a polyethylene membrane 26 including ink storage reservoirs in the form of pockets 28, 30, 32, 34 for each of four different printing fluids. Typically the printing fluids will be cyan, magenta, yellow and black inks. Additional storage reservoirs may also be provided within base molding 20 in order to receive and store an ink fixative and/or an infrared ink as various applications may require. In this regard there may be up to six storage reservoirs provided with base molding 20. As membrane 26 is filled with printing fluids it expands and conversely, as ink is consumed during printing the membrane collapses.

Cover molding 36 includes a recess 38 that receives an ink inlet molding 24 having a number of passageways. A number of apertures 42A-42E are formed through recess 38 and are arranged to communicate with corresponding passageways of ink inlet molding 24. The passages of the ink inlet member convey ink from an externally fitted ink refill cartridge to each of the ink storage reservoirs via a series of ink delivery paths formed into ink membrane 26. The ink delivery paths connect each aperture 42A-42E of the ink inlet member 24 to its dedicated ink storage reservoir 28-34. The ink is typically delivered under pressure thereby causing it to flow into and expand the reservoirs of membrane 26. An ink inlet seal 40 is located over the outside of recess 38 in order to seal apertures 42A-42E prior to use.

Figure 7:
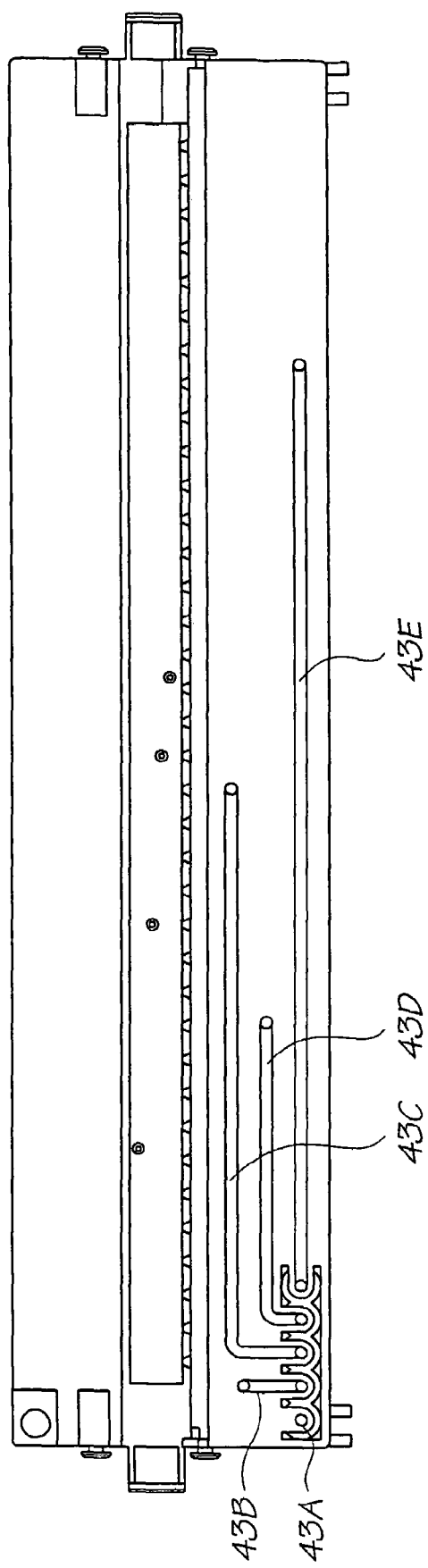
FIG. 7 is a plan view of the underside of a base molding of the cartridge revealing a number of printing fluid conduits.

Pagewidth printhead chip 52 is disposed along the outside of cartridge base molding 20 in the region below the ink storage reservoirs. As shown in FIG. 7, a number of conduits 43A-43E are formed in the underside of the cartridge base molding and are in direct communication with each of ink storage reservoirs 28, 30, 32, 34. The conduits provide an ink delivery path from the underside of cartridge base molding 20 to inlet ports provided in ink delivery moldings 48 onto which the printhead chip 52 is attached.

Referring again to FIG. 6, ink delivery moldings 48 are preferably made from a plastic, such as LCP (Liquid Crystal Polymer) via an injection molding process and include a plurality of elongate conduits disposed along the length thereof arranged to distribute printing fluids from the reservoirs in membrane 26 to printhead chip 52. Each of the elongate conduits are dedicated to carry a specific fluid, such as a particular color ink or a fixative and to allow the fluid to be distributed along the length of the printhead. To assist in controlled delivery of the printing fluid an ink sealing strip 45 is placed between cartridge base molding 20 and ink delivery molding 48. The ink sealing strip is formed with apertures that allow fluid transfer to occur between the two elements, however the strip acts to seal the channels formed in the cartridge base molding to prevent fluid leakage.

Formed in cartridge base molding 20 adjacent the elongate ink distribution conduits, is an air distribution channel 50 that acts to distribute pressurized air from air inlet port 76 over the nozzles of printhead 52. The air distribution channel runs along the length of printhead 52 and communicates with air inlet port 76. A porous air filter 51 extends along the length of air distribution channel 50 and serves to remove dust and particulate matter that may be present in the air and which might otherwise contaminate printhead 52. Porous air filter 51 has a selected porosity so that only air at a desired threshold pressure is able to pass through it, thereby ensuring that the air is evenly delivered at a constant pressure along the length of the printhead. In use, channel 50 firstly fills with compressed air until it reaches the threshold pressure within the channel. Once the threshold pressure is reached the air is able to pass through porous air filter 51 evenly along the length of the filter. The filtered air is then directed over the printhead.

Figure 15:
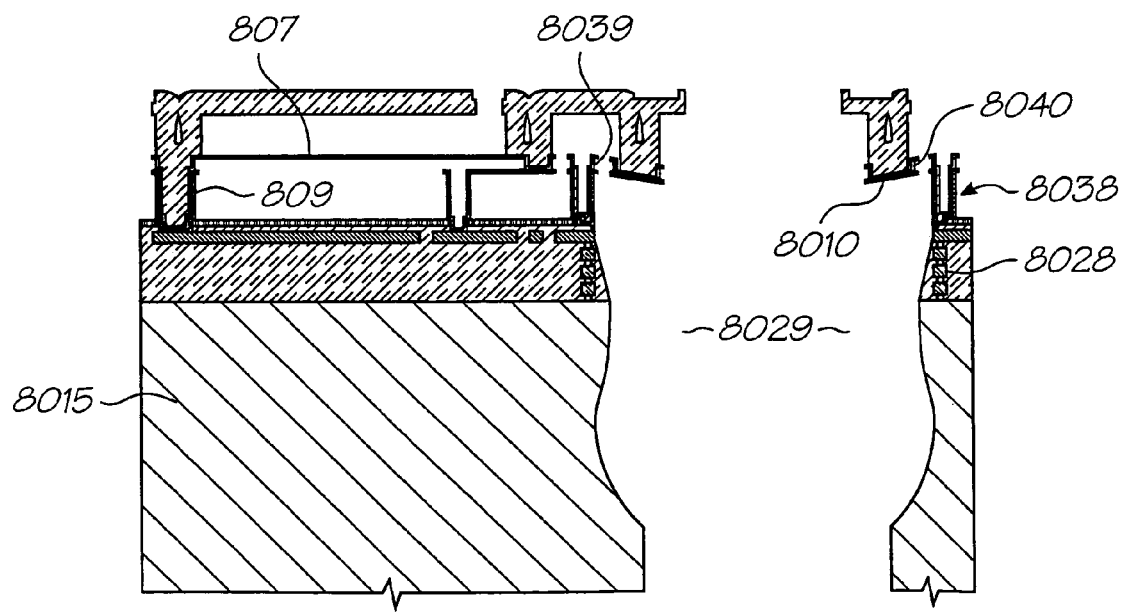
FIG. 15 is a cross section of a printhead chip nozzle.

The purpose of the pressurized air is to prevent degradation of the printhead by keeping its nozzles free of dust and debris. The pressurized air is provided by an air compressor (item 122 of FIG. 3) incorporated into cradle 4. An air nozzle (item 124 of FIG. 15) of the compressor pierces air seal 44 upon insertion of cartridge 6 into cradle 4 and mates with air inlet port 76. An air coverplate 54 is fixed to the cartridge base molding and evenly distributes air across printhead 52 in the manner described above.

Power and data signals are provided to printhead 52 by means of busbar 56 which is in turn coupled to external data and power connectors 58A and 58B. An authentication device in the form of a quality assurance (QA) chip 57 is mounted to connector 58A. Upon inserting print cartridge 6 into cradle 4 the data and power connectors 58A and 58B, and QA chip 57, mate with corresponding connectors (items 84A, 84B of FIG. 3) on cradle 4, thereby facilitating power and data communication between the cradle and the cartridge. QA chip 57 is tested in use by a portion of controller board 82 configured to act as a suitable verification circuit.

Rotor element 60 is rotatably mounted adjacent and parallel to printhead 52. The rotor element has three faces, as briefly explained previously, as follows: a platen face, which during printing acts as a support for print media and assists in bringing the print media close to printhead 52; a capping face for capping the printhead when not in use in order to reduce evaporation of printing fluids from the nozzles; and a blotter face, for blotting the printhead subsequent to a printing operation. The three faces of the rotor element are each separated by 120 degrees.

At opposite ends of rotor element 60 there extend axial pins 64A and 64B about which are fixed cogs 62A and 62B respectively. The free ends of axial pins 64A and 64B are received into slider blocks 66A and 66B. Slider blocks 66A and 66B include flanges 68A and 68B which are located within slots 70A and 70B of end plates 22A and 22B. The end plates are fixed at either end of cartridge base molding 20.

Figure 8:
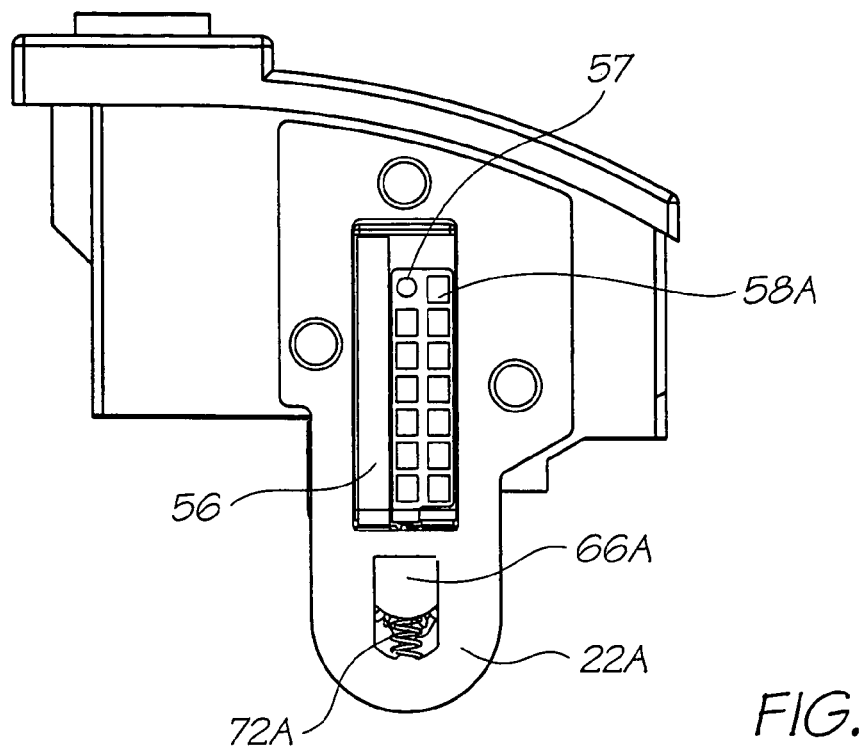
FIG. 8 is a right-hand plan view of the printer cartridge.
Figure 9:
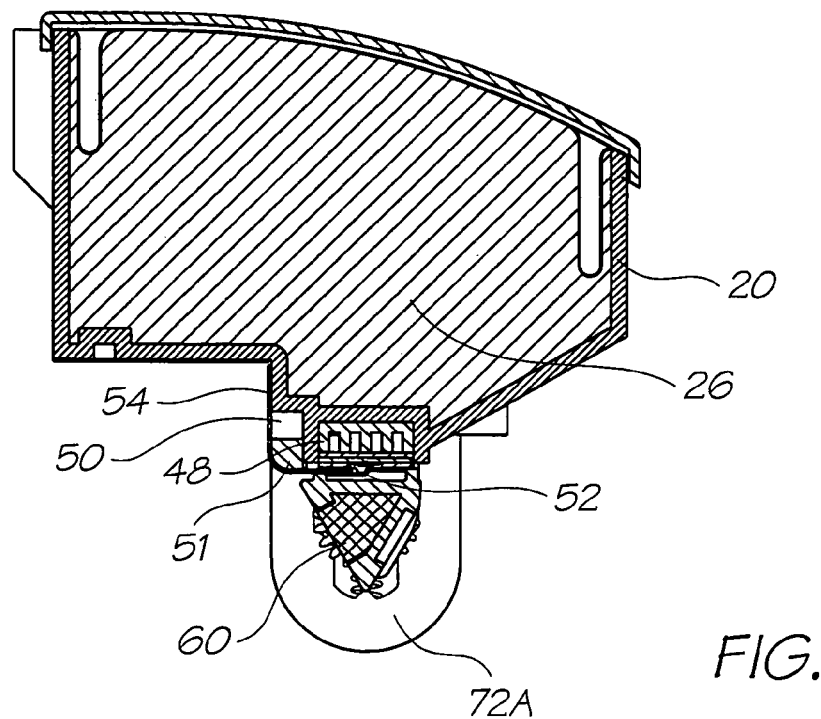
FIG. 9 is a cross-sectional view of the printer cartridge.

Slider blocks 66A and 66B are biased towards the printhead end of slots 70A and 70B by springs 72A and 72B held at either end by their insertion into blind holes in slider block 66A and 66B and by their seating over protrusions into slots 70A and 70B as best seen in FIG. 8. Accordingly, rotor element 60 is normally biased so it is brought closely adjacent to printhead 52.

During transport, and whilst printer cartridge 6 is being inserted into cradle 4, rotor element 60 is arranged so that its capping face caps printhead 52 in order to prevent the surrounding air from drying out the printhead's nozzles.

Printhead

Figure 18:
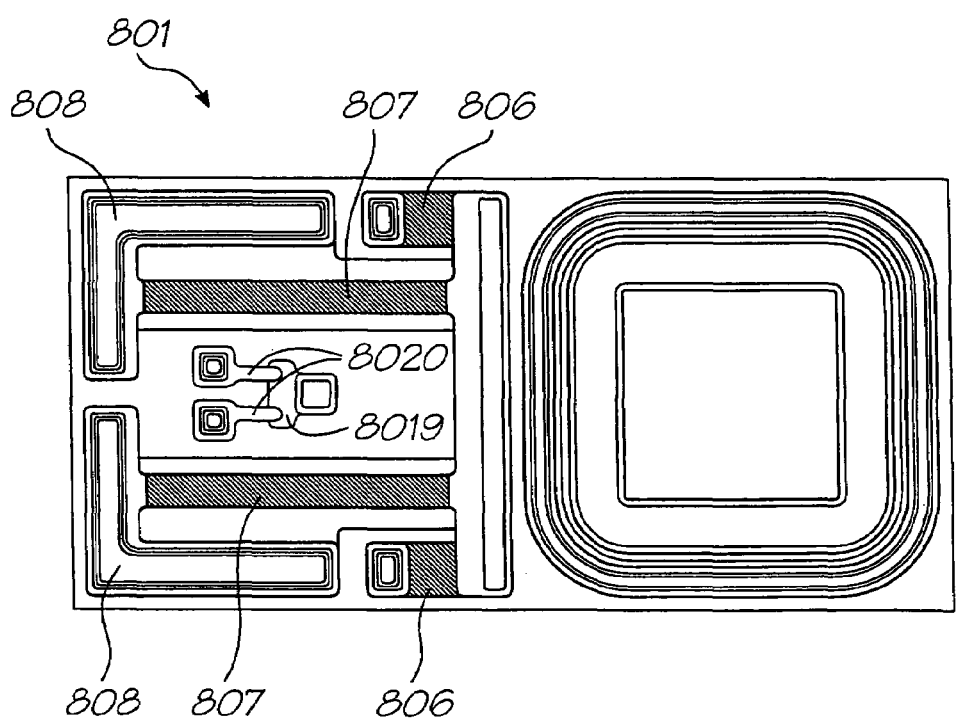
FIG. 18 is a plan, and partially cutaway view of a printhead chip nozzle.
Figure 19:
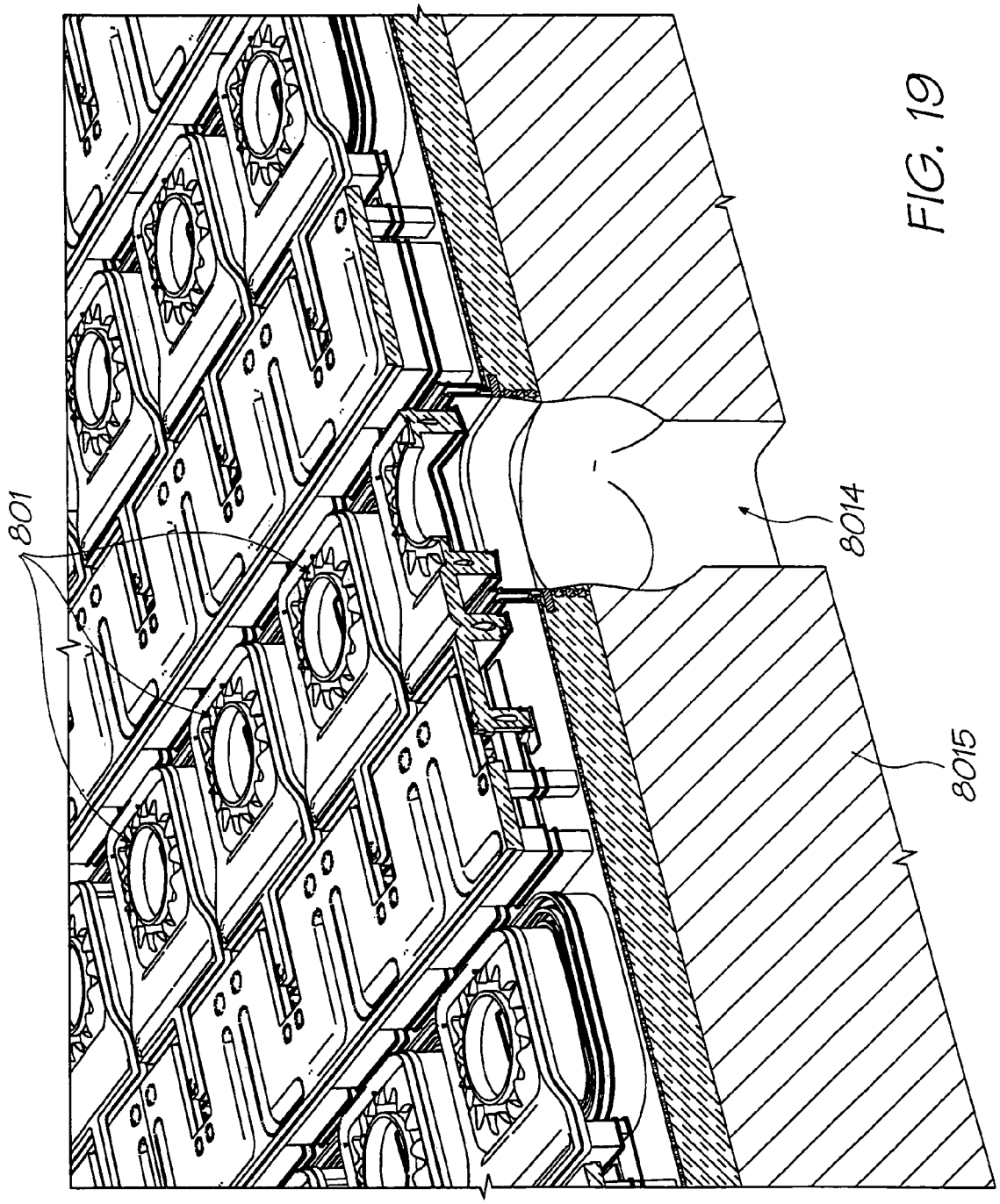
FIG. 19 is a perspective cross-sectioned view of a portion of a printhead chip.

A preferred design for pagewidth printhead 52 will now be explained. A printhead of the following type may be fabricated with a width of greater than eight inches if desired and will typically include at least 20,000 nozzles and in some variations more than 30,000. The preferred printhead nozzle arrangement, comprising a nozzle and corresponding actuator, will now be described with reference to FIGS. 10 to 19. FIG. 19 shows an array of the nozzle arrangements 801 formed on a silicon substrate 8015. The nozzle arrangements are identical, but in the preferred embodiment, different nozzle arrangements are fed with different colored inks and fixative. It will be noted that rows of the nozzle arrangements 801 are staggered with respect to each other, allowing closer spacing of ink dots during printing than would be possible with a single row of nozzles. The multiple rows also allow for redundancy (if desired), thereby allowing for a predetermined failure rate per nozzle.

Each nozzle arrangement 801 is the product of an integrated circuit fabrication technique. In particular, the nozzle arrangement 801 defines a micro-electromechanical system (MEMS).

For clarity and ease of description, the construction and operation of a single nozzle arrangement 801 will be described with reference to FIGS. 10 to 18.

The ink jet printhead chip 52 (FIG. 6) includes a silicon wafer substrate 8015. 0.35 Micron 1 P4M 12 volt CMOS microprocessing circuitry is positioned on the silicon wafer substrate 8015.

A silicon dioxide (or alternatively glass) layer 8017 is positioned on the wafer substrate 8015. The silicon dioxide layer 8017 defines CMOS dielectric layers. CMOS top-level metal defines a pair of aligned aluminium electrode contact layers 8030 positioned on the silicon dioxide layer 8017. Both the silicon wafer substrate 8015 and the silicon dioxide layer 8017 are etched to define an ink inlet channel 8014 having a generally circular cross section (in plan). An aluminium diffusion barrier 8028 of CMOS metal 1, CMOS metal 2/3 and CMOS top level metal is positioned in the silicon dioxide layer 8017 about the ink inlet channel 8014. The diffusion barrier 8028 serves to inhibit the diffusion of hydroxyl ions through CMOS oxide layers of the drive circuitry layer 8017.

A passivation layer in the form of a layer of silicon nitride 8031 is positioned over the aluminium contact layers 8030 and the silicon dioxide layer 8017. Each portion of the passivation layer 8031 positioned over the contact layers 8030 has an opening 8032 defined therein to provide access to the contacts 8030.

Figure 10:
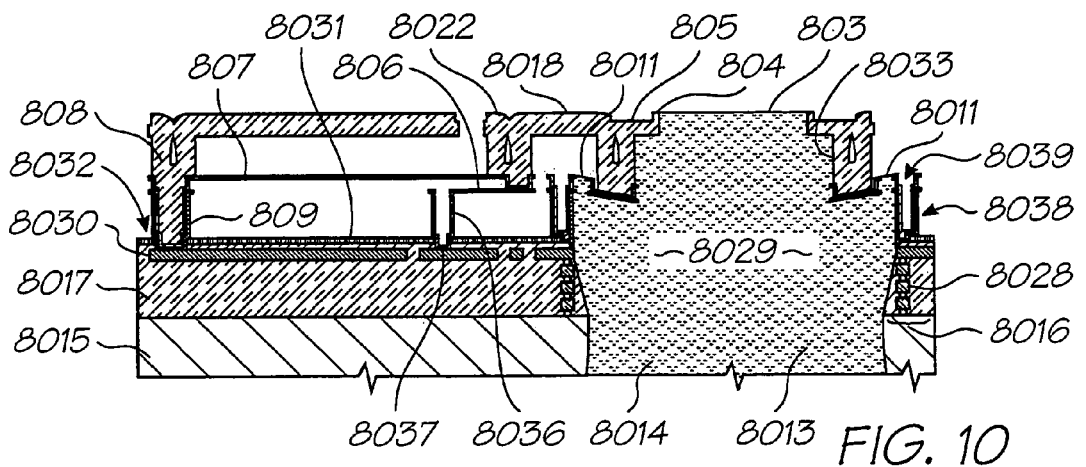
FIG. 10 is a cross sectional view through a printhead chip nozzle in a first state of operation.

The nozzle arrangement 801 includes a nozzle chamber 8029 defined by an annular nozzle wall 8033, which terminates at an upper end in a nozzle roof 805 and a radially inner nozzle rim 804 that is circular in plan. The ink inlet channel 8014 is in fluid communication with the nozzle chamber 8029. At a lower end of the nozzle wall, there is disposed a moving rim 8010, that includes a moving seal lip 8040. An encircling wall 8038 surrounds the movable nozzle, and includes a stationary seal lip 8039 that, when the nozzle is at rest as shown in FIG. 10, is adjacent the moving rim 8010. A fluidic seal 8011 is formed due to the surface tension of ink trapped between the stationary seal lip 8039 and the moving seal lip 8040. This prevents leakage of ink from the chamber whilst providing a low resistance coupling between the encircling wall 8038 and the nozzle wall 8033.

Figure 17:
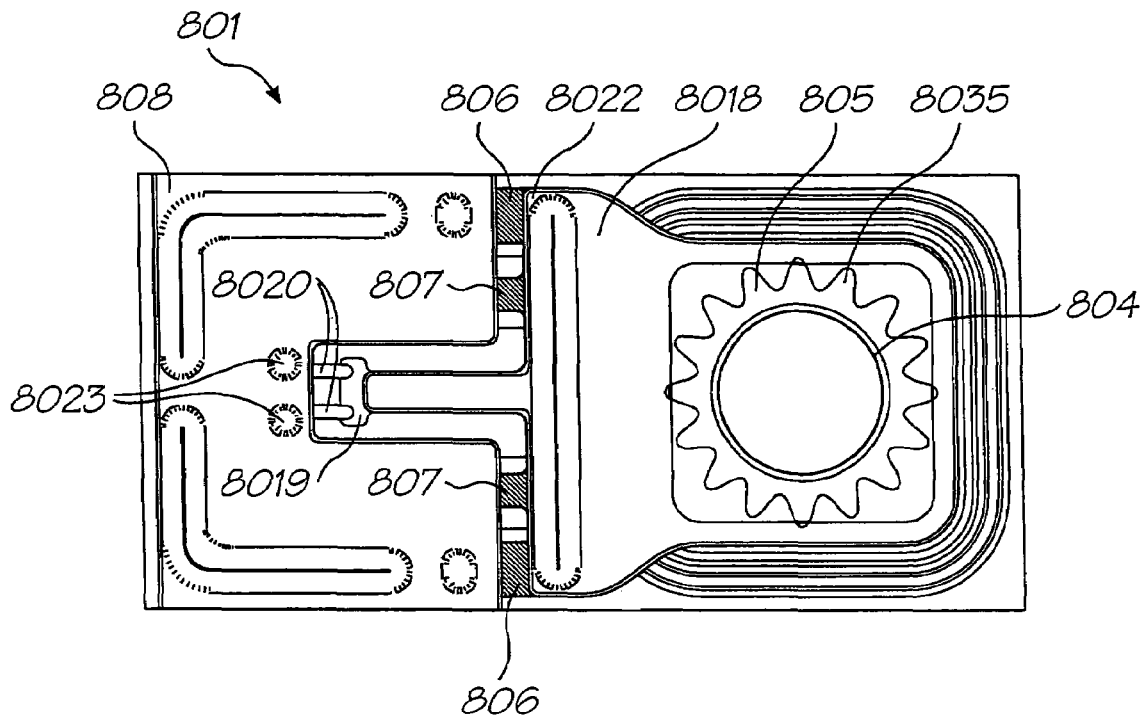
FIG. 17 is a plan view of a printhead chip nozzle.

As best shown in FIG. 17, a plurality of radially extending recesses 8035 is defined in the roof 805 about the nozzle rim 804. The recesses 8035 serve to contain radial ink flow as a result of ink escaping past the nozzle rim 804.

The nozzle wall 8033 forms part of a lever arrangement that is mounted to a carrier 8036 having a generally U-shaped profile with a base 8037 attached to the layer 8031 of silicon nitride.

Figure 13:
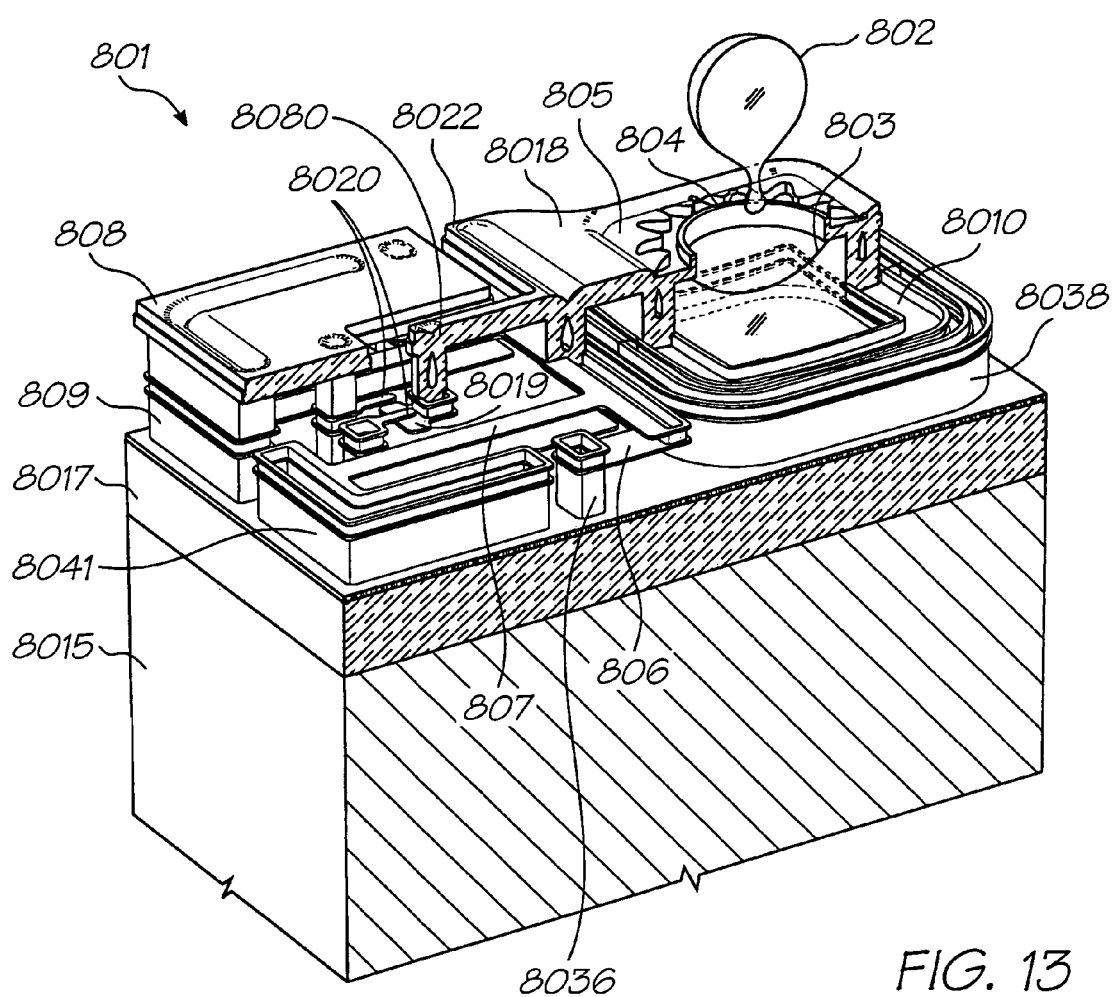
FIG. 13 is a perspective, and partially cutaway, view of a printhead chip nozzle subsequent to ejection of an ink droplet.
Figure 14:
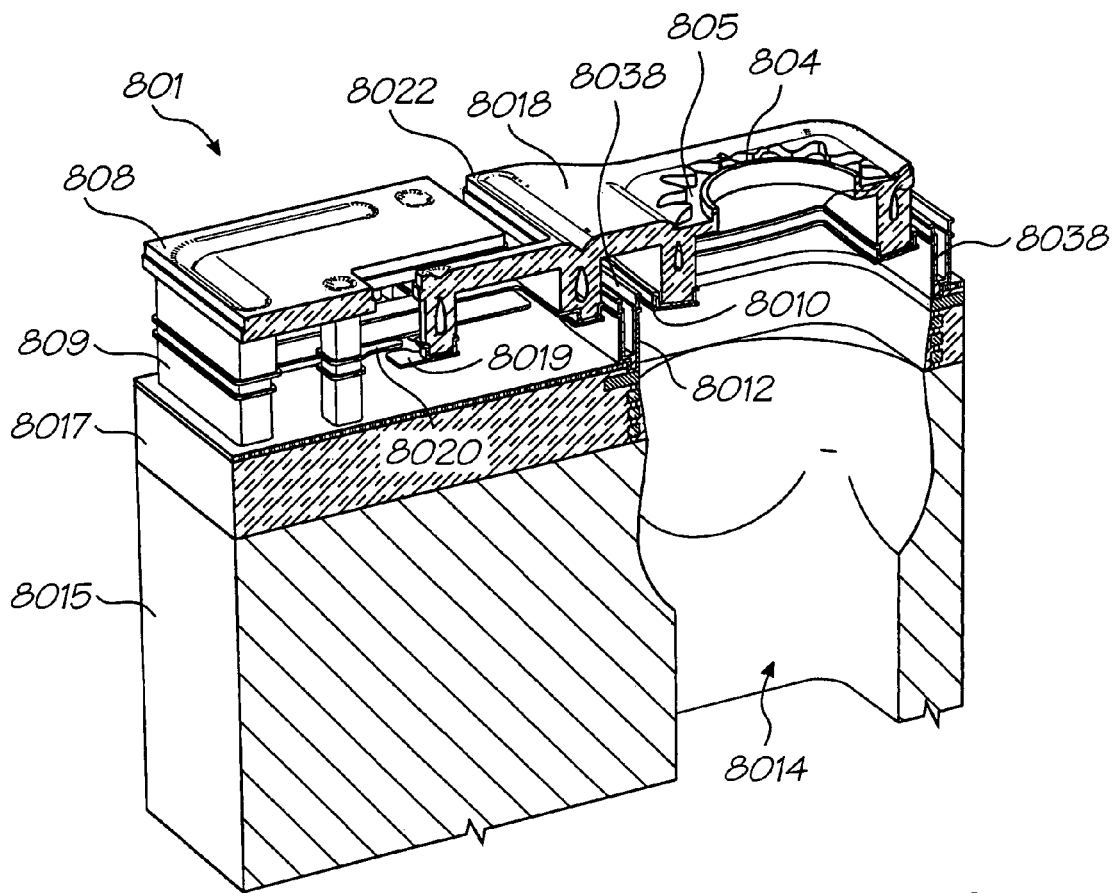
FIG. 14 is a perspective cross section of a printhead chip nozzle.

The lever arrangement also includes a lever arm 8018 that extends from the nozzle walls and incorporates a lateral stiffening beam 8022. The lever arm 8018 is attached to a pair of passive beams 806, formed from titanium nitride (TiN) and positioned on either side of the nozzle arrangement, as best shown in FIGS. 13 and 18. The other ends of the passive beams 806 are attached to the carrier 8036.

The lever arm 8018 is also attached to an actuator beam 807, which is formed from TiN. It will be noted that this attachment to the actuator beam is made at a point a small but critical distance higher than the attachments to the passive beam 806.

Figure 16:
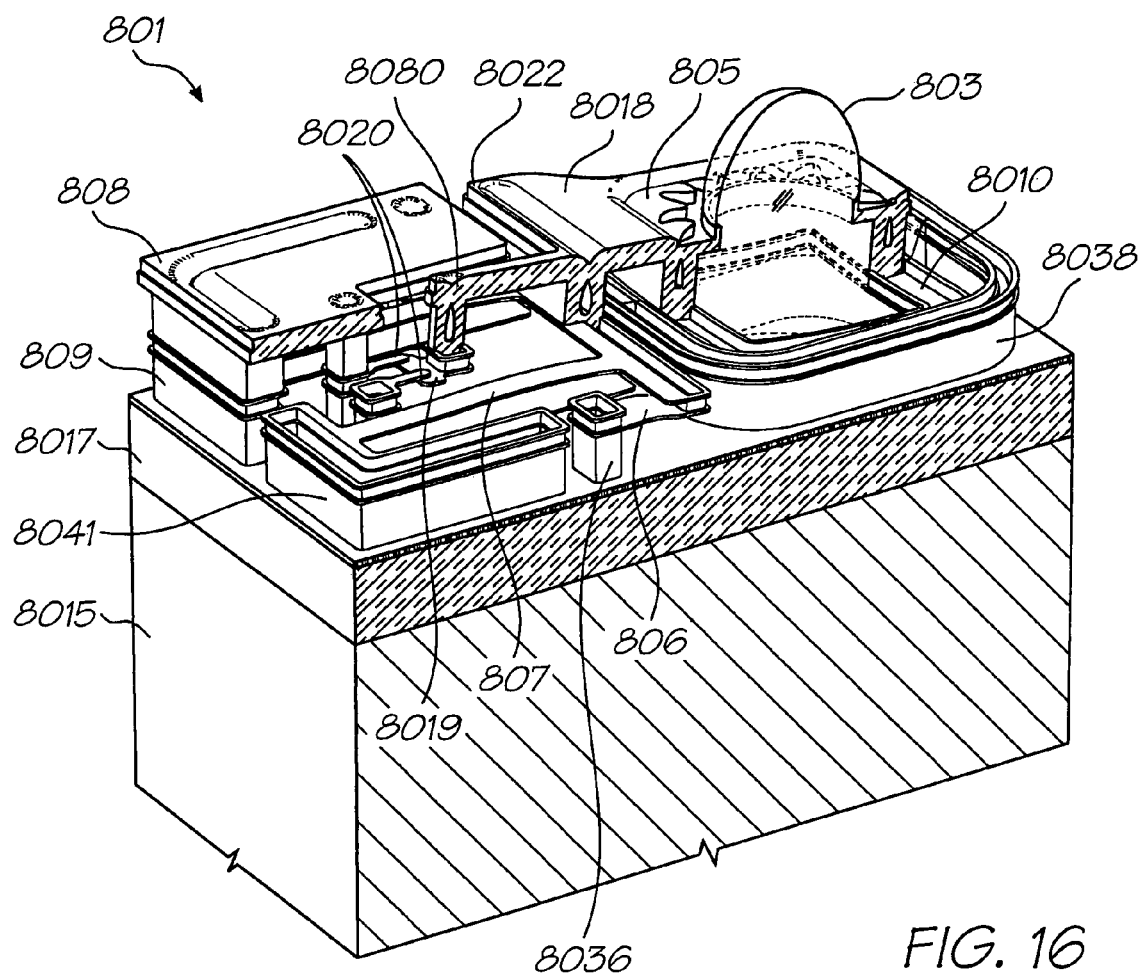
FIG. 16 is a perspective and partially cutaway perspective view of a printhead chip nozzle.

As best shown in FIGS. 13 and 16, the actuator beam 807 is substantially U-shaped in plan, defining a current path between the electrode 809 and an opposite electrode 8041. Each of the electrodes 809 and 8041 are electrically connected to respective points in the contact layer 8030. As well as being electrically coupled via the contacts 809, the actuator beam is also mechanically anchored to anchor 808. The anchor 808 is configured to constrain motion of the actuator beam 807 to the left of FIGS. 10 to 12 when the nozzle arrangement is in operation.

The TiN in the actuator beam 807 is conductive, but has a high enough electrical resistance that it undergoes self-heating when a current is passed between the electrodes 809 and 8041. No current flows through the passive beams 806, so they do not expand.

In use, the device at rest is filled with ink 8013 that defines a meniscus 803 under the influence of surface tension. The ink is retained in the chamber 8029 by the meniscus, and will not generally leak out in the absence of some other physical influence.

Figure 11:
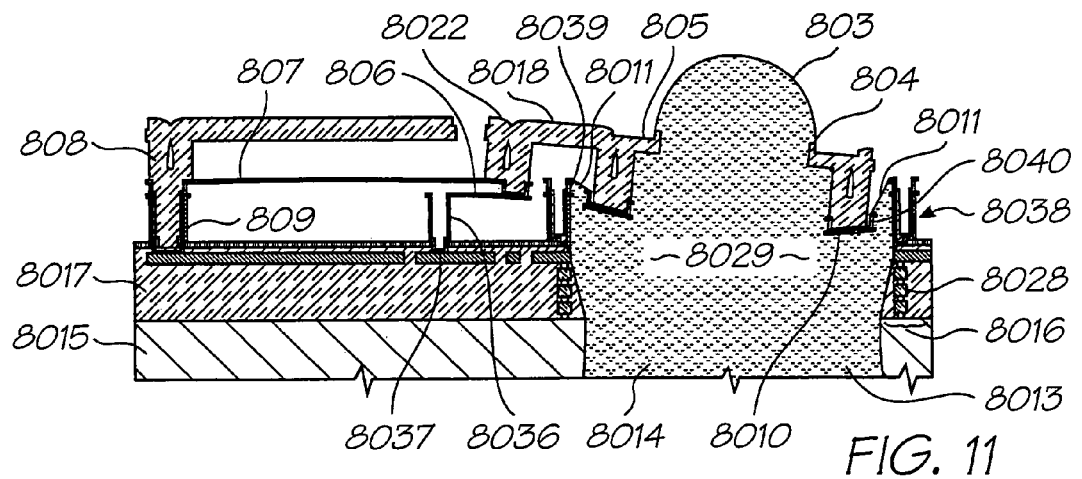
FIG. 11 is a cross sectional view through the printhead chip nozzle in a second state of operation.

As shown in FIG. 11, to fire ink from the nozzle, a current is passed between the contacts 809 and 8041, passing through the actuator beam 807. The self-heating of the beam 807 due to its resistance causes the beam to expand. The dimensions and design of the actuator beam 807 mean that the majority of the expansion in a horizontal direction with respect to FIGS. 10 to 12. The expansion is constrained to the left by the anchor 808, so the end of the actuator beam 807 adjacent the lever arm 8018 is impelled to the right.

The relative horizontal inflexibility of the passive beams 806 prevents them from allowing much horizontal movement the lever arm 8018. However, the relative displacement of the attachment points of the passive beams and actuator beam respectively to the lever arm causes a twisting movement that causes the lever arm 8018 to move generally downwards. The movement is effectively a pivoting or hinging motion. However, the absence of a true pivot point means that the rotation is about a pivot region defined by bending of the passive beams 806.

The downward movement (and slight rotation) of the lever arm 8018 is amplified by the distance of the nozzle wall 8033 from the passive beams 806. The downward movement of the nozzle walls and roof causes a pressure increase within the chamber 8029, causing the meniscus to bulge as shown in FIG. 11. It will be noted that the surface tension of the ink means the fluid seal 8011 is stretched by this motion without allowing ink to leak out.

Figure 12:
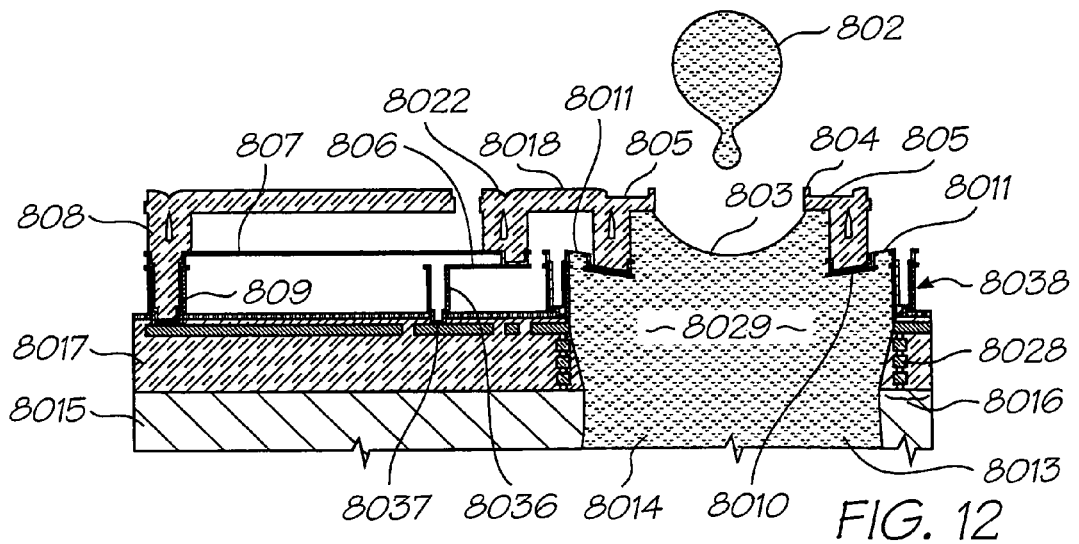
FIG. 12 is a cross sectional view through a printhead chip nozzle subsequent to ejection of an ink droplet.

As shown in FIG. 12, at the appropriate time, the drive current is stopped and the actuator beam 807 quickly cools and contracts. The contraction causes the lever arm to commence its return to the quiescent position, which in turn causes a reduction in pressure in the chamber 8029. The interplay of the momentum of the bulging ink and its inherent surface tension, and the negative pressure caused by the upward movement of the nozzle chamber 8029 causes thinning, and ultimately snapping, of the bulging meniscus to define an ink drop 802 that continues upwards until it contacts adjacent print media.

Immediately after the drop 802 detaches, meniscus 803 forms the concave shape shown in FIG. 12. Surface tension causes the pressure in the chamber 8029 to remain relatively low until ink has been sucked upwards through the inlet 8014, which returns the nozzle arrangement and the ink to the quiescent situation shown in FIG. 10.

As best shown in FIG. 13, the nozzle arrangement also incorporates a test mechanism that can be used both post-manufacture and periodically after the printhead is installed. The test mechanism includes a pair of contacts 8020 that are connected to test circuitry (not shown). A bridging contact 8019 is provided on a finger 8080 that extends from the lever arm 8018. Because the bridging contact 8019 is on the opposite side of the passive beams 806, actuation of the nozzle causes the priding contact to move upwardly, into contact with the contacts 8020. Test circuitry can be used to confirm that actuation causes this closing of the circuit formed by the contacts 8019 and 8020. If the circuit closed appropriately, it can generally be assumed that the nozzle is operative.

Cradle

Figure 20:
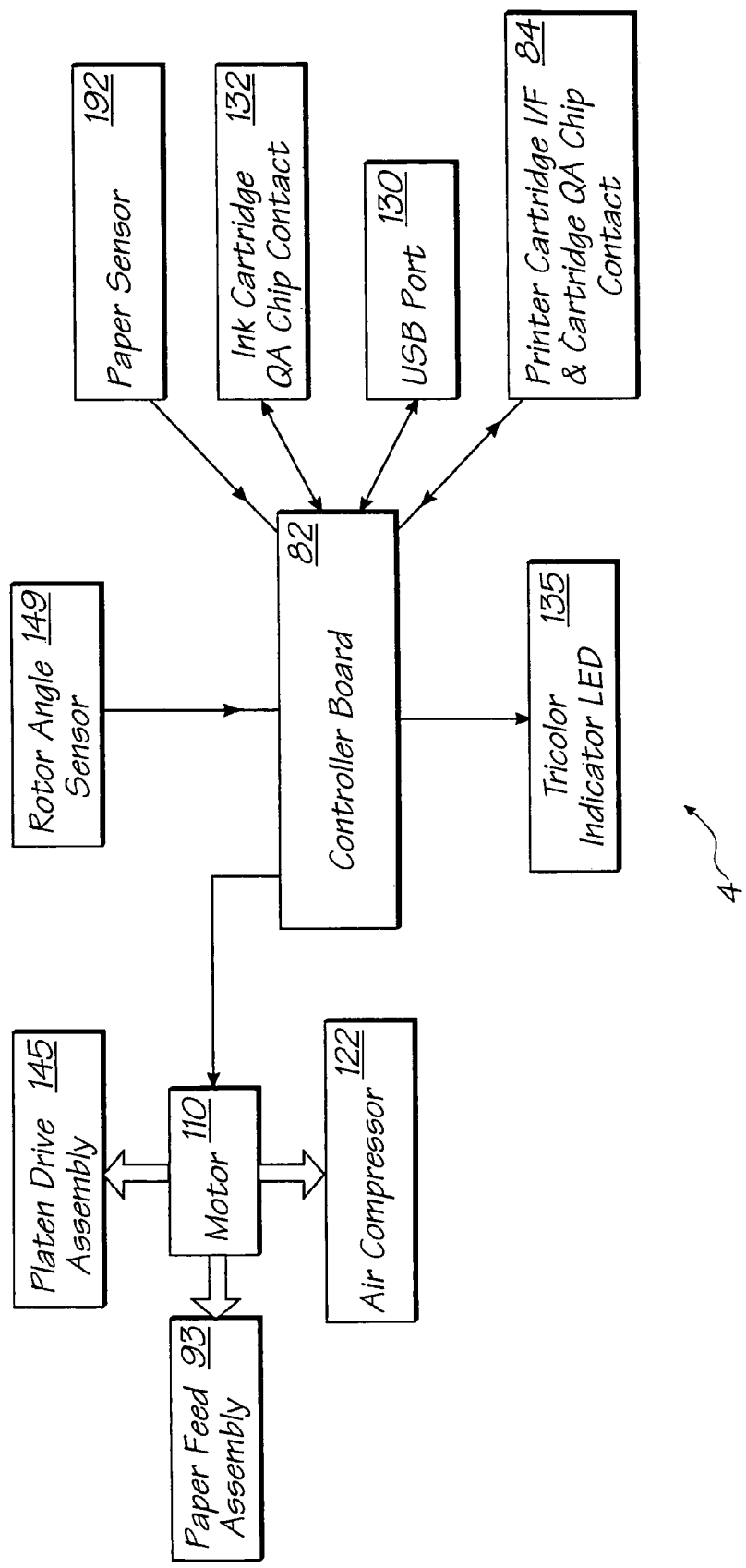
FIG. 20 is a block diagram of the printer cradle.
Figure 21:
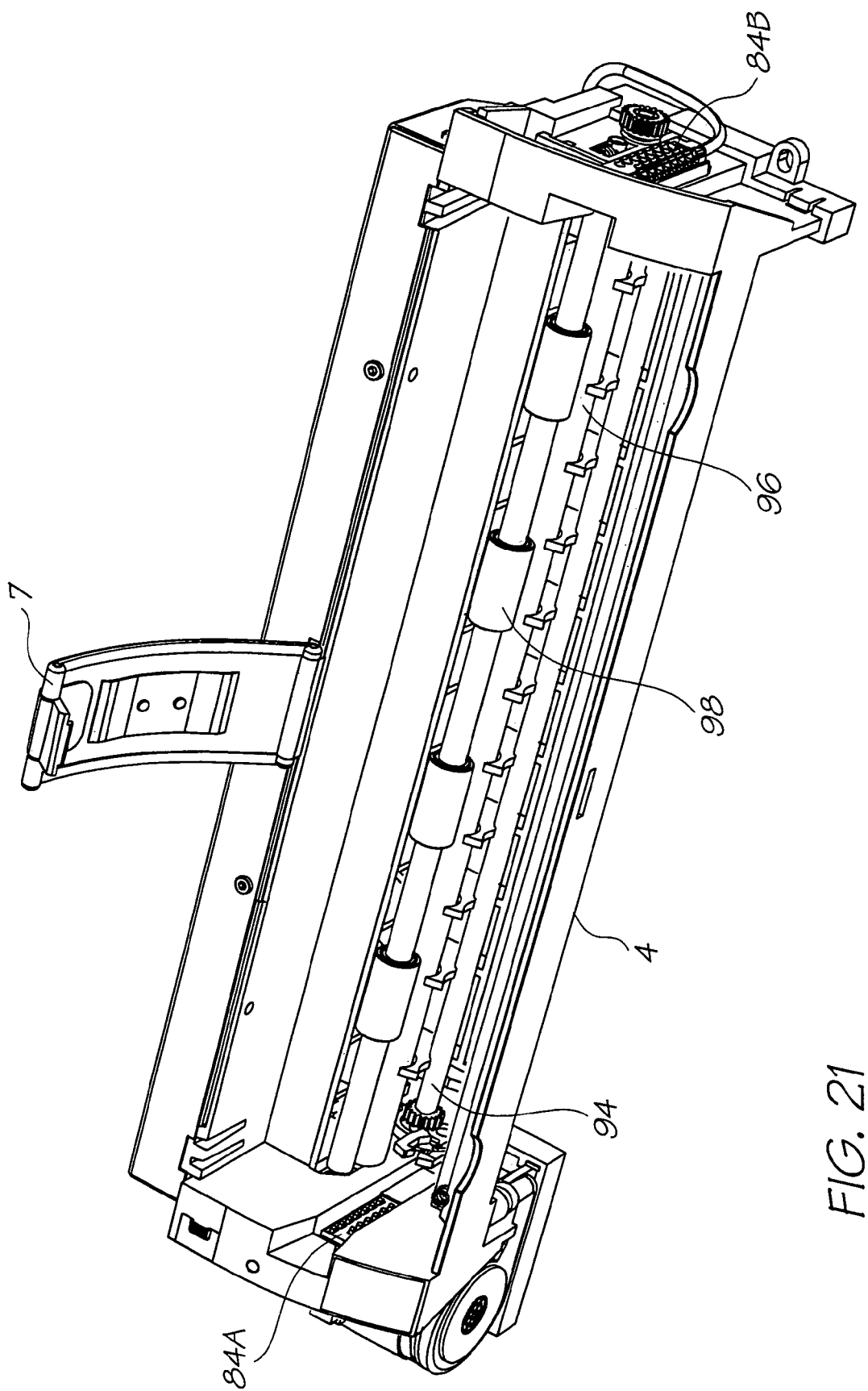
FIG. 21 is a perspective, front, left-hand, upper side view of the printer cradle.
Figure 22:
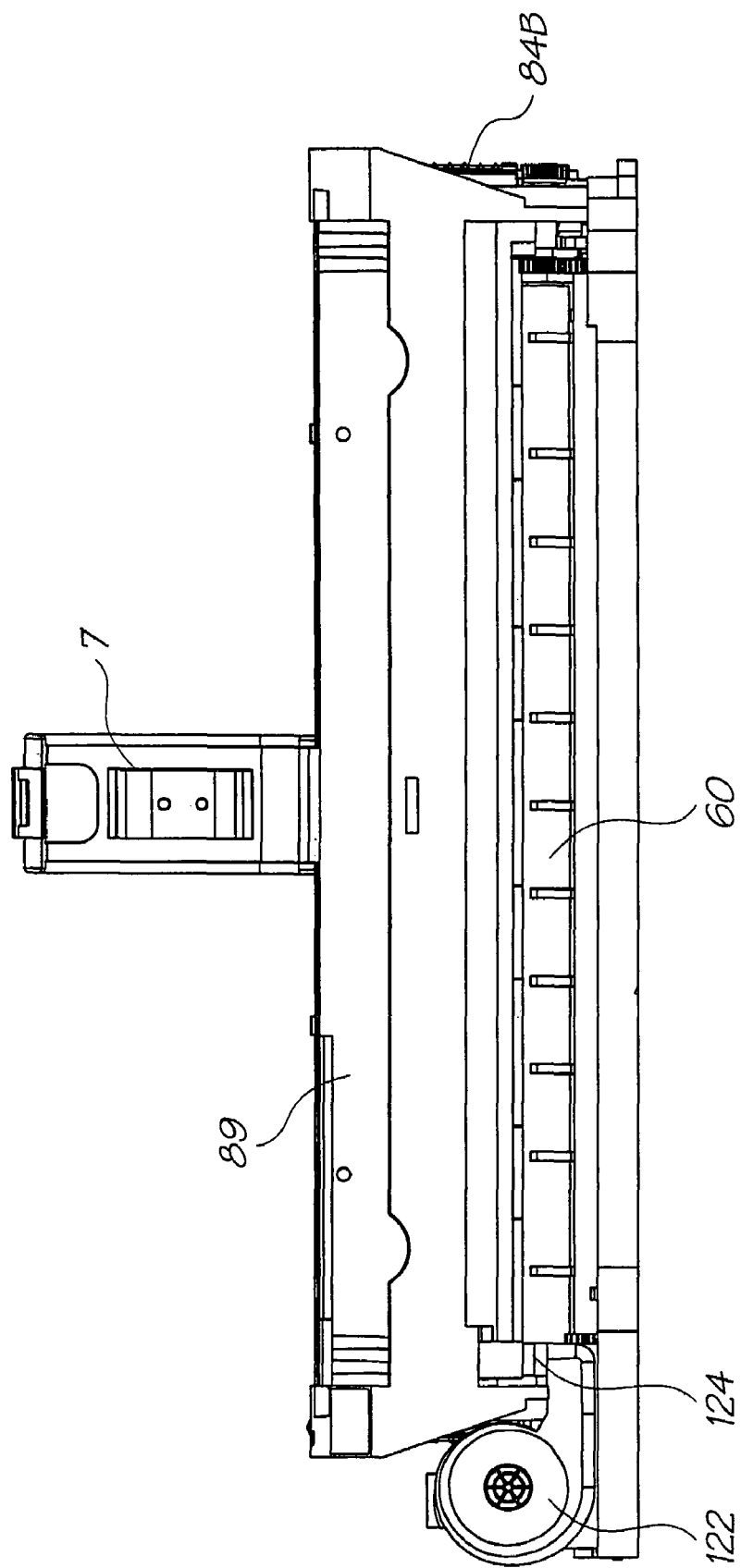
FIG. 22 is a front plan view of the printer cradle.
Figure 23:
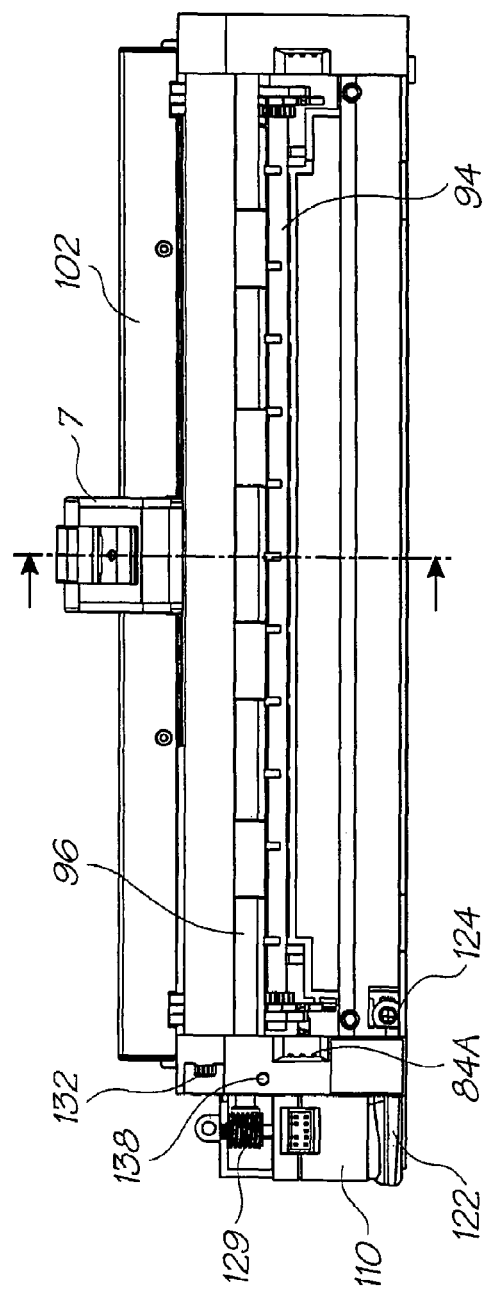
FIG. 23 is a top plan view of the printer cradle.
Figure 24:
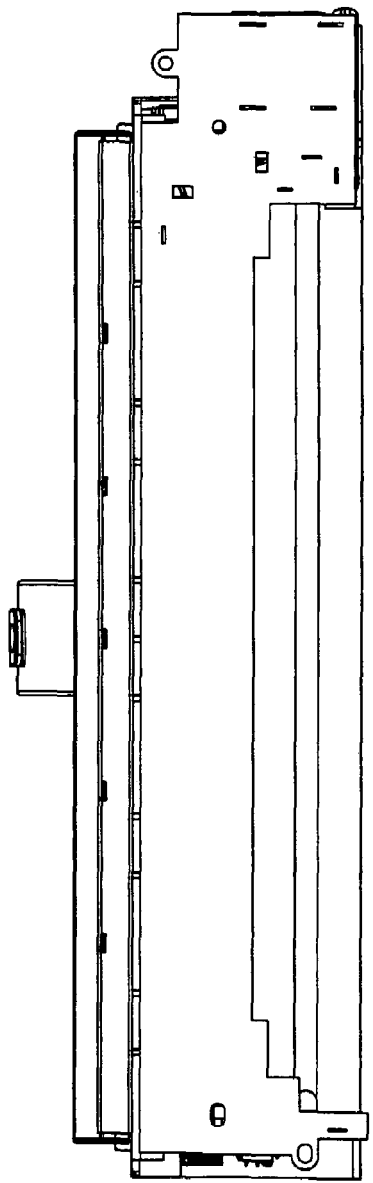
FIG. 24 is a bottom plan view of the printer cradle.

FIG. 20 is a functional block diagram of printer cradle 4. The printer cradle is built around a controller board 82 that includes one or more custom Small Office Home Office Printer Engine Chips (SoPEC) whose architecture will be described in detail shortly. Controller board 82 is coupled to a USB port 130 for connection to an external computational device such as a personal computer or digital camera containing digital files for printing. Controller board 82 also monitors:

a paper sensor 192, which detects the presence of print media;

a printer cartridge chip interface 84, which in use couples to printer cartridge QA chip 57 (see FIG. 6);

an ink refill cartridge QA chip contact 132, which in use couples to an ink refill cartridge QA chip (visible as item 176 in FIG. 37); and rotor element angle sensor 149, which detects the orientation of rotor element 60 (see FIG. 6).

In use the controller board processes the data received from USB port 130 and from the various sensors described above and in response drives a motor 110, tricolor indicator LED 135 and, via interface 84, printhead chip 52 (see FIG. 6). As will be explained in more detail later, motor 110 is mechanically coupled to drive a number of mechanisms that provide auxiliary services to print cartridge 6 (see FIG. 6). The driven mechanisms include:

a rotor element drive assembly 145, for operating rotor element 60 (see FIG. 6);

a print media transport assembly 93, which passes print media across printhead chip 52 during printing; and an air compressor 122 which provides compressed air to keep printhead chip 52 (see FIG. 6) clear of debris.

As will be explained in more detail shortly, motor 110 is coupled to each of the above mechanisms by a transmission assembly which includes a direct drive coupling from the motor spindle to an impeller of the air compressor and a worm-gear and cog transmission to the rotor element and print media transport assembly.

The structure of cradle 4 will now be explained with reference to FIGS. 21 to 31. As most clearly seen in the exploded view of FIG. 26, cradle 4 has a body shaped to complement cartridge 6 so that when mated together they form an inkjet printer. The cradle body is formed of base molding 90 and cradle molding 80. The base molding acts as a support base for the cradle and also locates drive motor 110, rotor element roller 94 and drive roller 96. The base molding is snap fastened to cradle molding 80 by means of a number of corresponding flanges 120 and slots 123. Cradle molding 80 defines an elongate recess 89 dimensioned to locate print cartridge 6. A number of indentations in the form of slots 86 are formed in an internal wall of the cradle for receiving complementary protrusions in the form of ribs 78 (FIG. 4) of cartridge 6. Consequently cartridge 6 must be correctly orientated in order for it to be fully received into cradle molding 80. Furthermore, the slots ensures that only those cartridges that are supported by the electronics of the cradle, and hence have non-interfering ribs, can be inserted into the cradle, thereby overcoming the problem of the drive electronics of the cradle attempting to drive cartridges having unsupported performance characteristics. Controller 82 is arranged to determine the performance characteristics of cartridges inserted into cradle 4 and to operate each cartridge in response to the determined performance characteristics. Consequently, it is possible for an inkjet cradle to be provided with a starter cartridge having relatively basic performance characteristics and then to upgrade as desired by replacing the starter cartridge with an improved performance upgrade cartridge. For example the upgrade cartridge may be capable of a higher print rate or support more inks than the starter cartridge.

Figure 25:
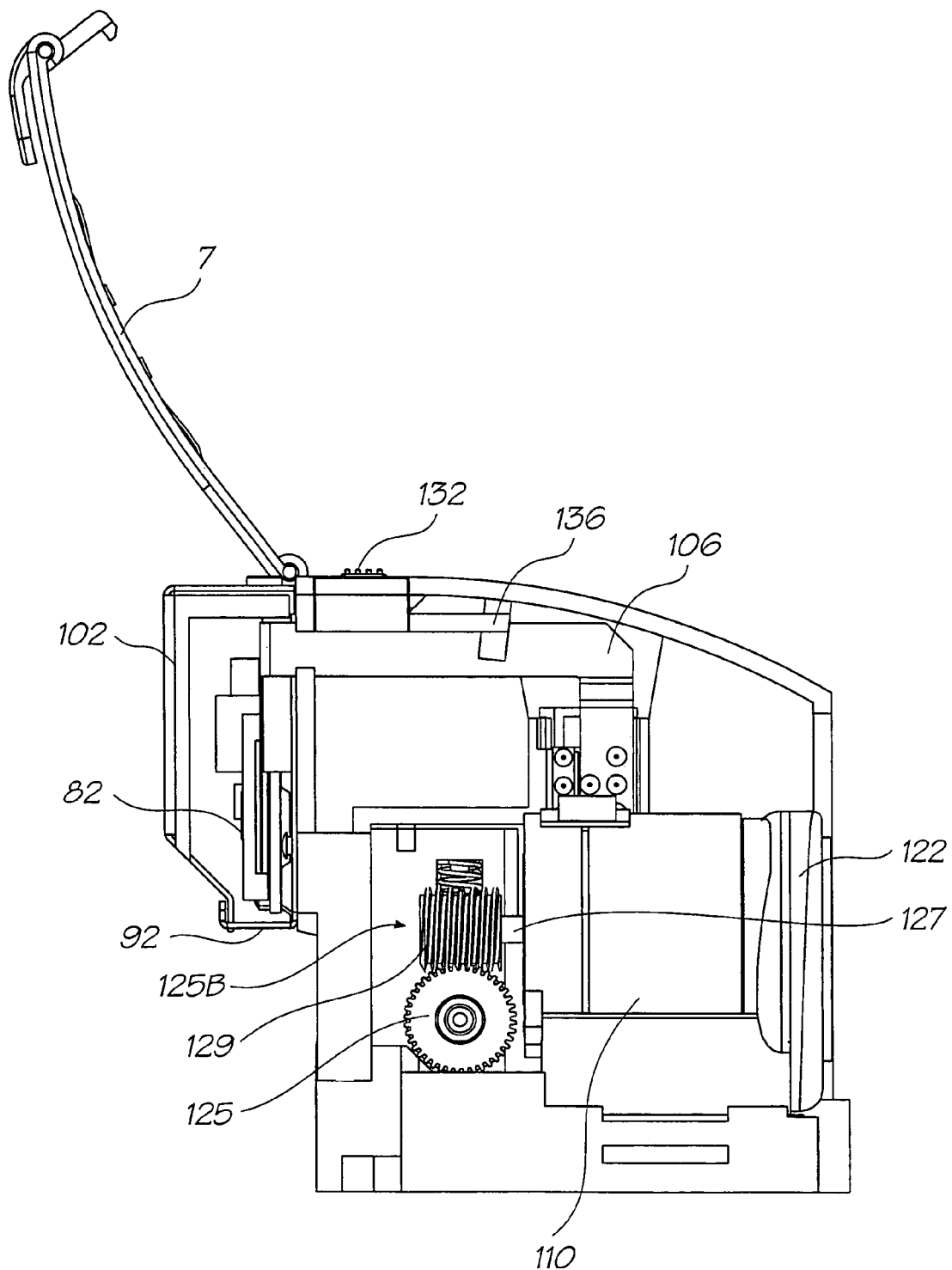
FIG. 25 is a right-hand plan view of the printer cradle.
Figure 26:
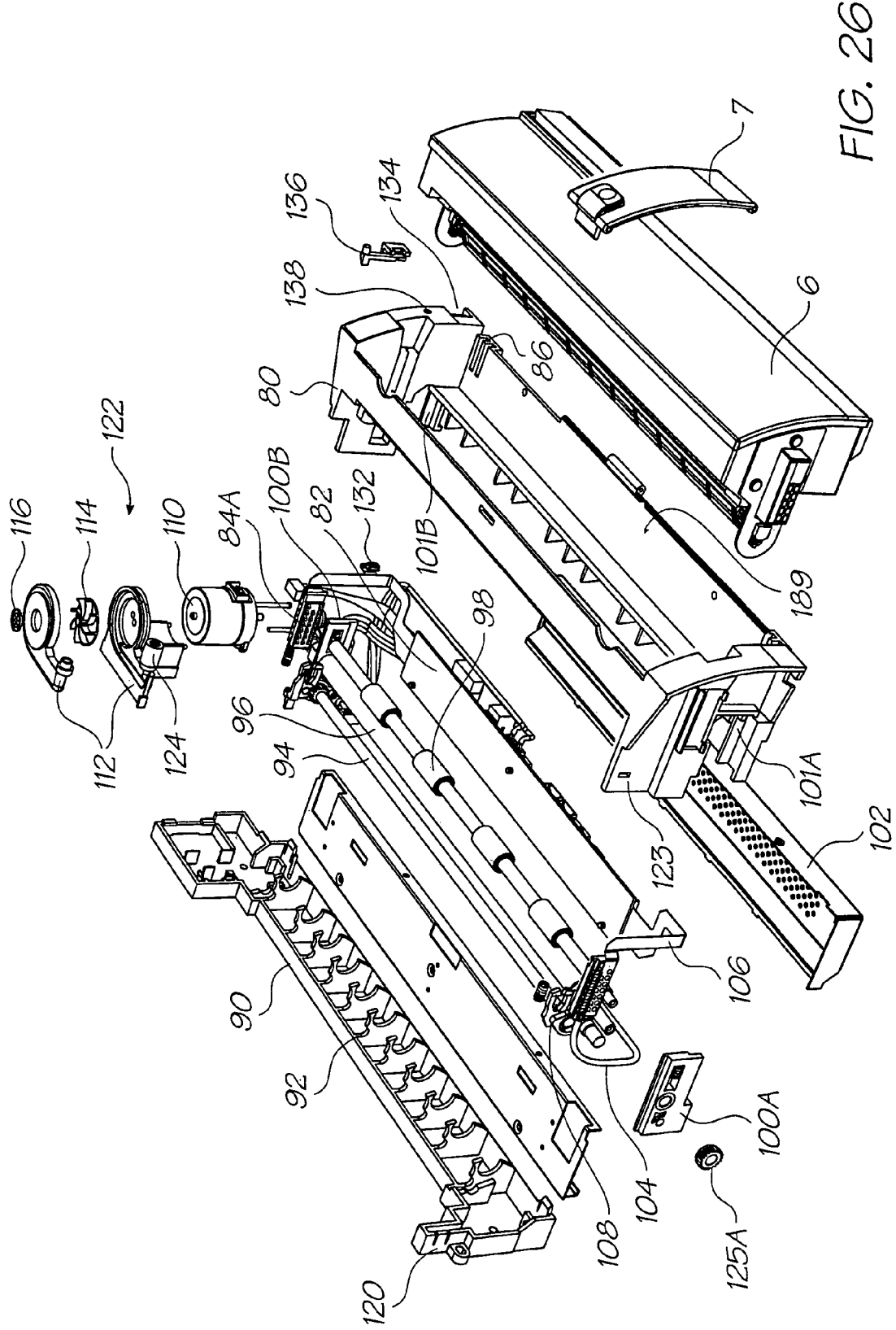
FIG. 26 is a perspective view of the left-hand, front and top sides of the printer cradle in an exploded state.

With reference to FIG. 25, drive shaft 127 of motor 110 terminates in a worm gear 129 that meshes with a cog 125B that is, in turn, fixed to drive roller 96. Referring again to FIG. 26, the drive roller is supported at either end by bearing mount assemblies 100A and 100B, which are in turn fixed into slots 101A and 101B of cradle mounting 80 (see FIG. 30). Similarly, rotor element translation roller 94 and pinch roller 98 are also supported by bearing mount assemblies 100A and 100B.

Figure 30:
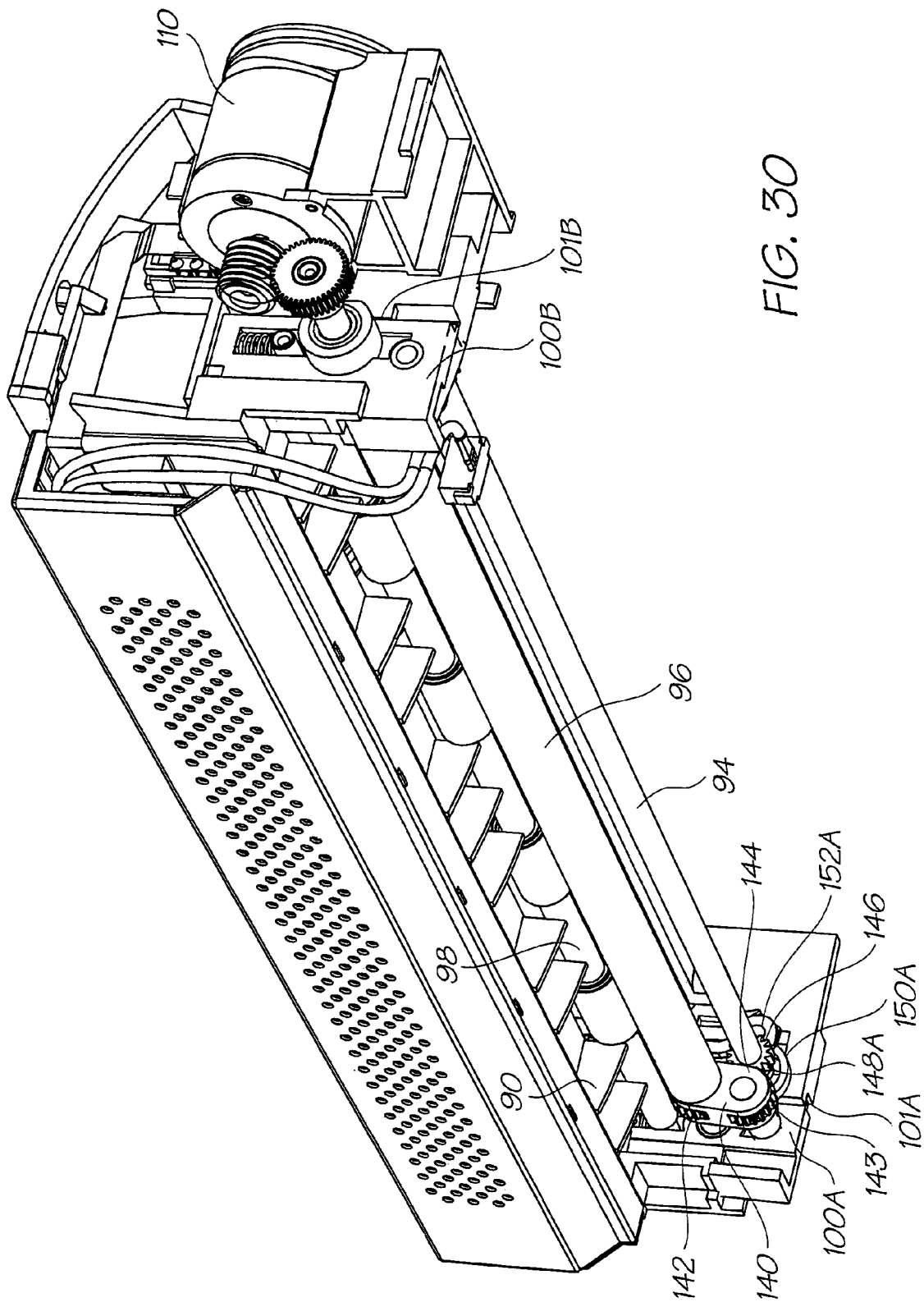
FIG. 30 is a perspective detail view of a portion of the left-hand side of the printer cradle.

Referring now to FIG. 30, opposite the motor end of drive roller 96 there is located a flipper gear assembly 140. The flipper gear assembly consists of a housing 144 which holds an inner gear 142 and an outer gear 143 that mesh with each other. The inner gear is fixed and coaxial with drive roller 96 whereas housing 144 is free to rotate about drive roller 96. In use the housing rotates with drive roller 96 taking with it outer gear 143 until it either abuts a stopper located on the cradle base molding 90 or outer gear 143 meshes with rotor element drive cog 146. The direction of rotation of drive roller 96 is dependent on the sense of the driving current applied to motor 110 by control board 82 (see FIG. 29). The meshing of outer gear 143 with rotor element drive cog 146 forms rotor element drive assembly 145 comprising drive roller 96, inner gear 142, outer gear 143 and rotor element drive cog 146. Consequently, in this configuration power can be transmitted from drive roller 96 to rotor element drive roller 94.

Figure 31:
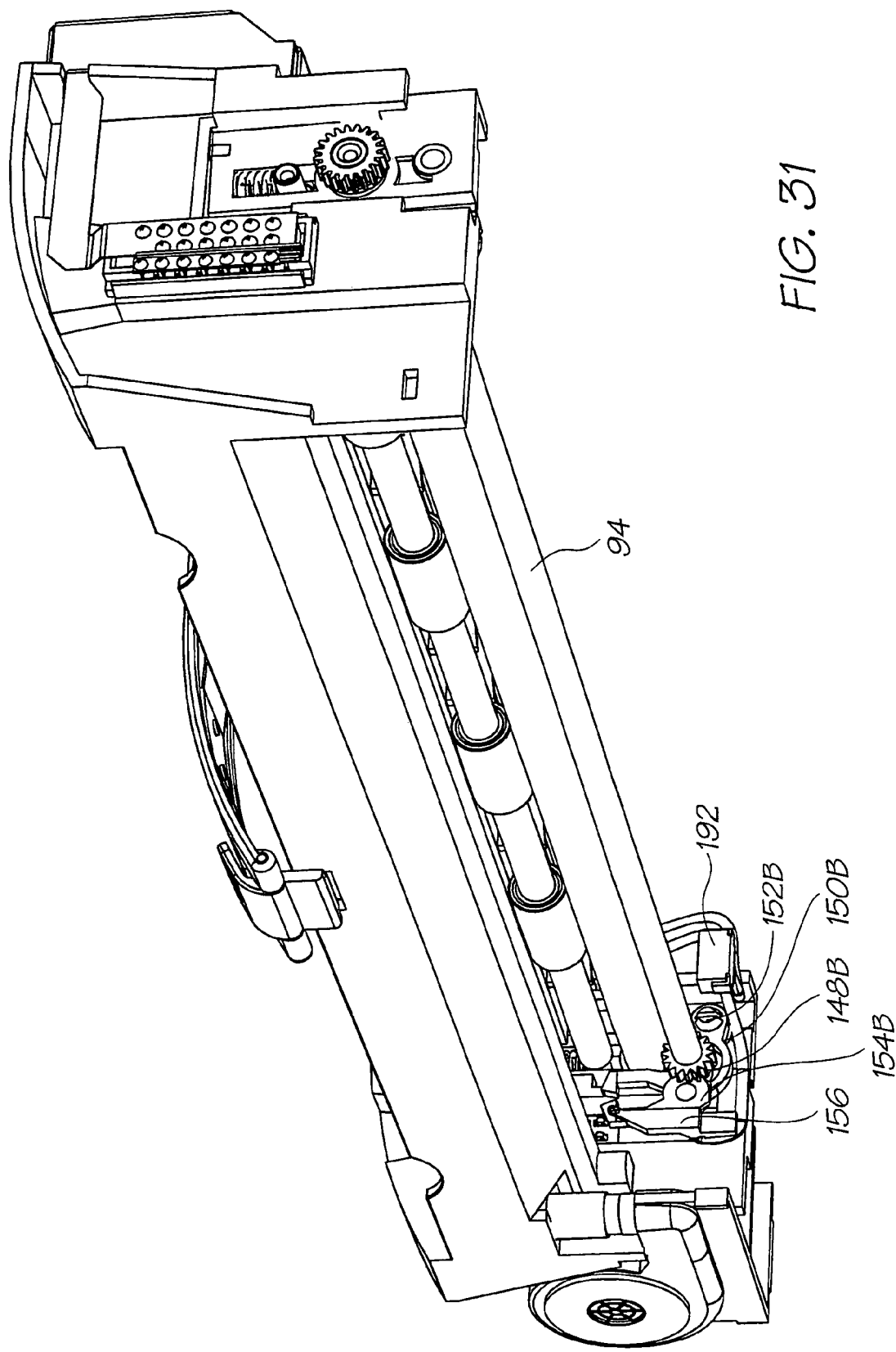
FIG. 31 is a perspective detail view of a portion of the right-hand side of the printer cradle.

With reference to FIGS. 30 and 31, the opposite ends of rotor element drive roller 94 terminate in cams 148A and 148B which are located in corresponding cam followers 150A and 150B. Cam followers 150A and 150B are ring shaped and pivotally secured at one side by pivot pins 152A and 152B respectively. Hinged jaws 154A and 154B are provided for clutching the rotor element slider blocks (items 66A, 66B of FIG. 6) of the printer cartridge. The jaws are each pivotally connected to cam followers 150A and 150B opposite pins 152A and 152B respectively. Upon rotor element drive roller 94 being rotated, cams 148A and 148B abut the inner wall of cam followers 150A and 150B thereby causing the cam followers to rise taking with them jaws 154A and 154B respectively.

In order to ensure that rotor element 60 is rotated through the correct angle, cradle 4 includes a rotor element sensor unit 156 (FIG. 20) to detect the actual orientation of the rotor element. Sensor unit 156 consists of a light source and a detector unit which detects the presence of reflected light. Rotor element 60 has a reflective surface that is arranged to reflect rays from the light source so that the orientation of the rotor element can be detected by sensor 156. In particular, by monitoring sensor unit 156, controller board 82 is able to determine which face of rotor element 60 is adjacent printhead 52.

Apart from driving drive roller 96, motor 110 also drives an air compressor 122 that includes a fan housing 112, air filter 116 and impeller 114. Fan housing 112 includes an air outlet 124 that is adapted to mate with air inlet port 76 (FIG. 6) of cartridge 6.

Figure 27:
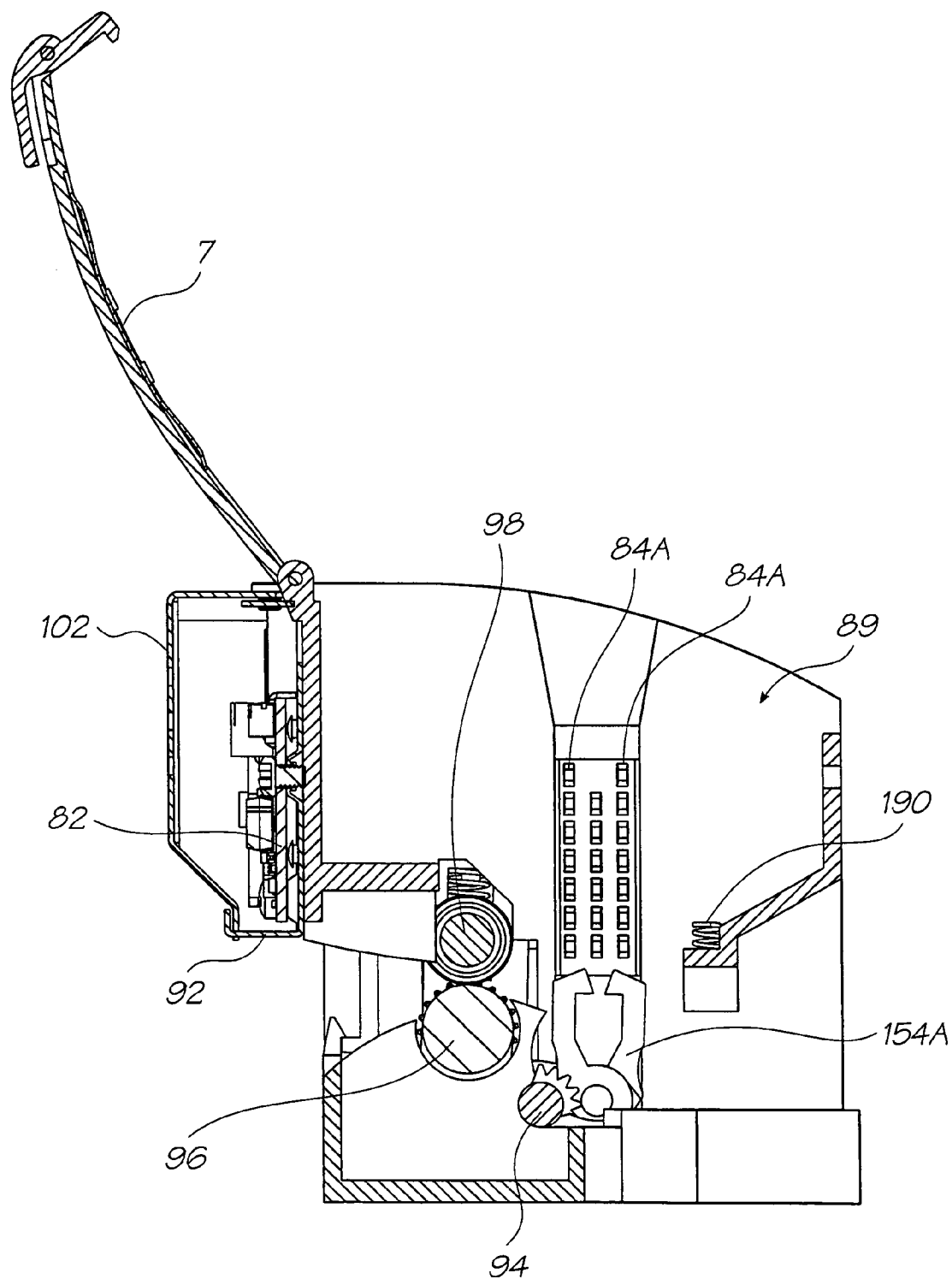
FIG. 27 is a right-hand, and partially cutaway, plan view of the printer cradle.
Figure 28:
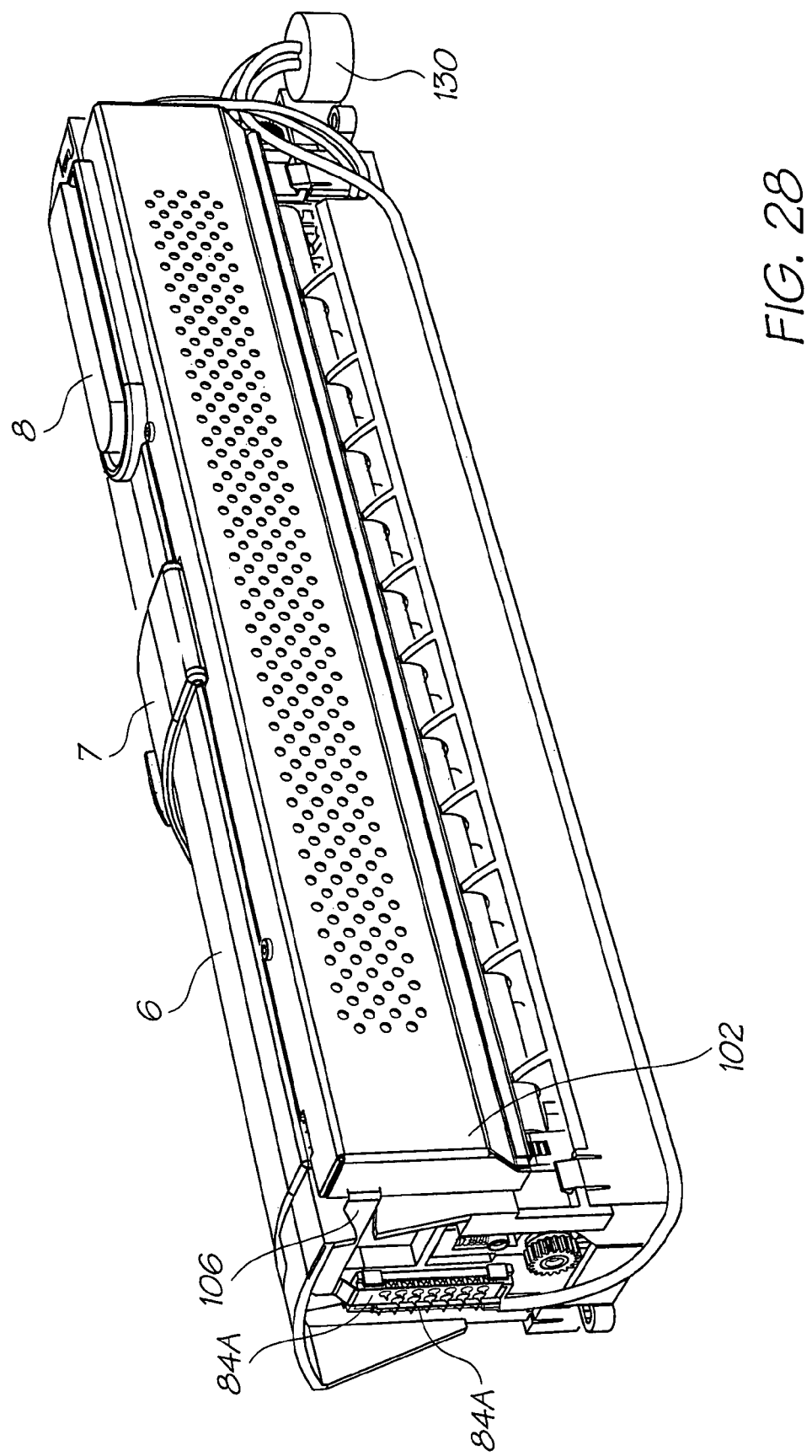
FIG. 28 is a perspective, rear left-hand and upper view of the printer cradle with print cartridge inserted.
Figure 29:
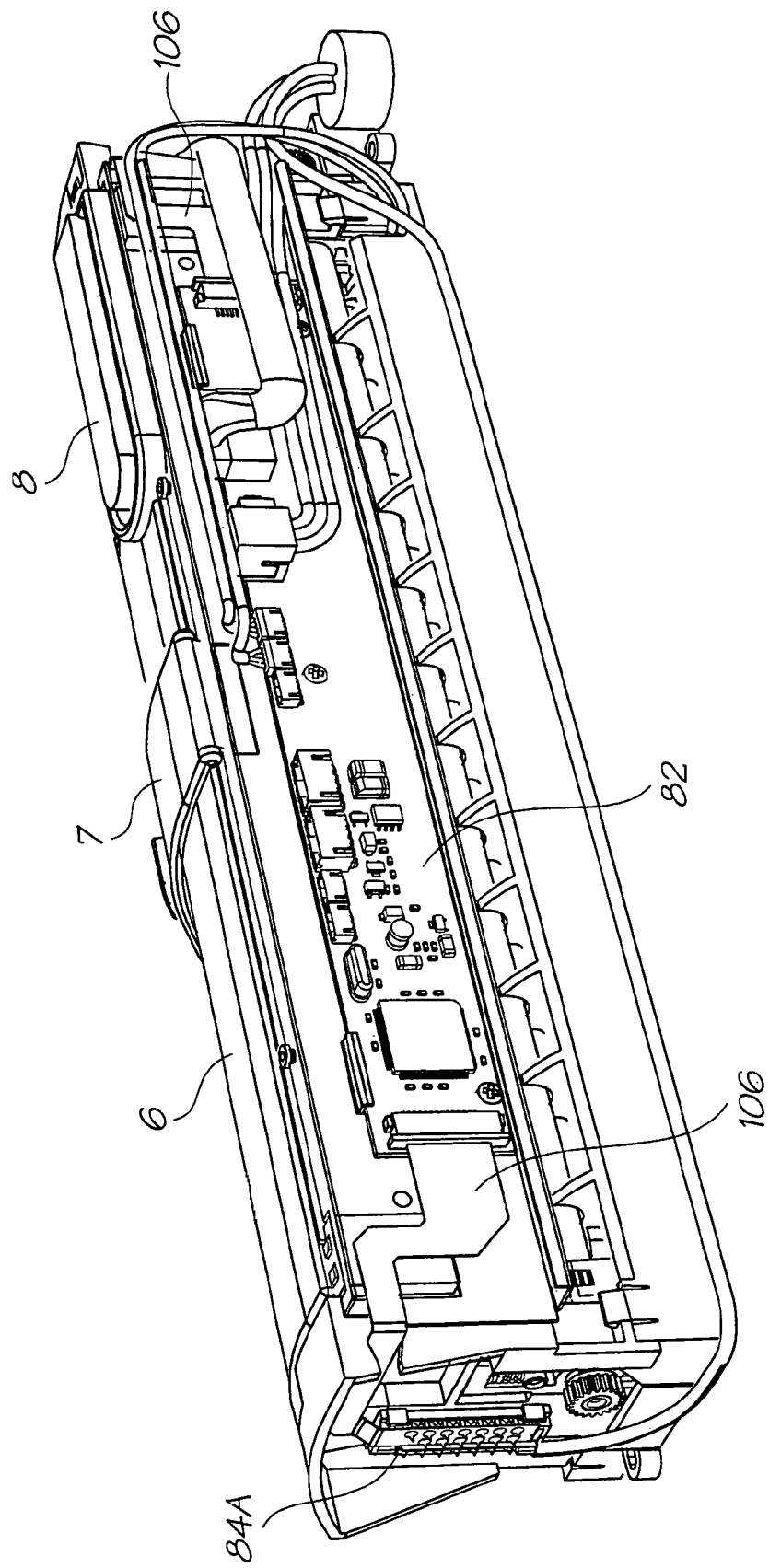
FIG. 29 is a perspective, rear left-hand and upper side view of the printer cradle with RFI shield removed.

A metal backplane 92 is secured to the rear of cradle molding 80 as may be best seen in side view in FIG. 25 and in cross section in FIG. 27. Mounted to backplane 92 is a control board 82 loaded with various electronic circuitry. The control board is covered by a metal radio frequency interference (RFI) shield 102. Control board 82 is electrically coupled to cradle connectors 84A and 84B via a flex PCB connector 106 and also to an external data and power connection point in the form of USB port connector 130. USB connector 130 enables connection to an external personal computer or other computational device. Cradle connectors 84A, 84B are supported in slots formed at either end of cradle molding 80 and are arranged so that upon printer cartridge 6 being fully inserted into recess 89 of the cradle molding, cradle connectors 84A and 84B make electrical contact with cartridge connectors 58A and 58B (see FIG. 6).

Controller board 82 is connected by various cable looms and flexible PCB 106 to QA chip contact 132. The QA chip contact is located in a recess 134 formed in cradle molding 80 and is situated so that during ink refilling it makes contact with a QA chip 176 located in an ink refill cartridge that will be described shortly.

Controller board 82 also drives a tricolor indicator LED (item 135 of FIG. 20) which is optically coupled to a lightpipe 136. The lightpipe terminates in an indicator port 138 formed in cradle molding 80 so that light from the tricolor indicator LED may be viewed from outside the casing.

Controller Board

Printer units according to a preferred embodiment of the invention have a fundamental structure, namely a cradle assembly which contains all of the necessary electronics, power and paper handling requirements, and a cartridge unit that includes the highly specialised printhead and ink handling requirements of the system, such that it may be possible for a cradle unit to support a cartridge unit which enables different capabilities without the need to purchase a new cradle unit.

In this regard, a range of cartridge units, each having a number of different features may be provided. For example, in a simple form it may be possible to provide a cartridge unit of three distinct types:

Starter Unit—15 ppm cartridge with 150 ml of ink capacity
Intermediate Unit—30 ppm cartridge with 300 ml of ink capacity
Professional Unit—60 ppm cartridge with +300 ml of ink storage capacity.

Such a system may be supported on one cradle unit with the user able to purchase different cartridge units depending upon their requirements and cost considerations.

In the case of the professional unit, it may be required that a special cradle unit be provided that supports the more developed and refined functionality of such a cartridge unit. Cartridge units of different functionality may bear indicia such as color coded markings so that their compatibility with the cradle units can be easily identified.

Figure 32:
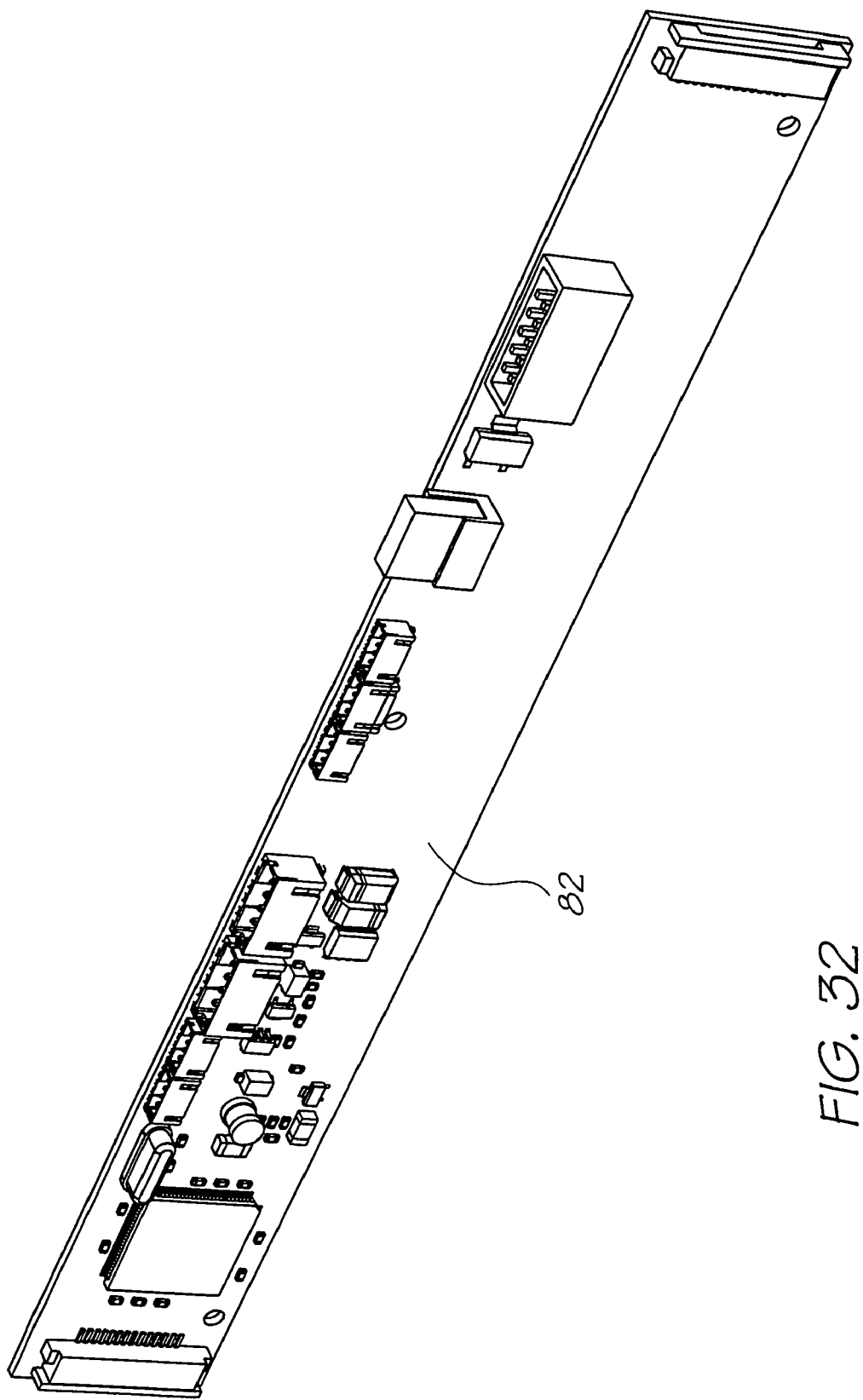
FIG. 32 is a perspective view of a single SoPEC chip controller board.
Figure 33:
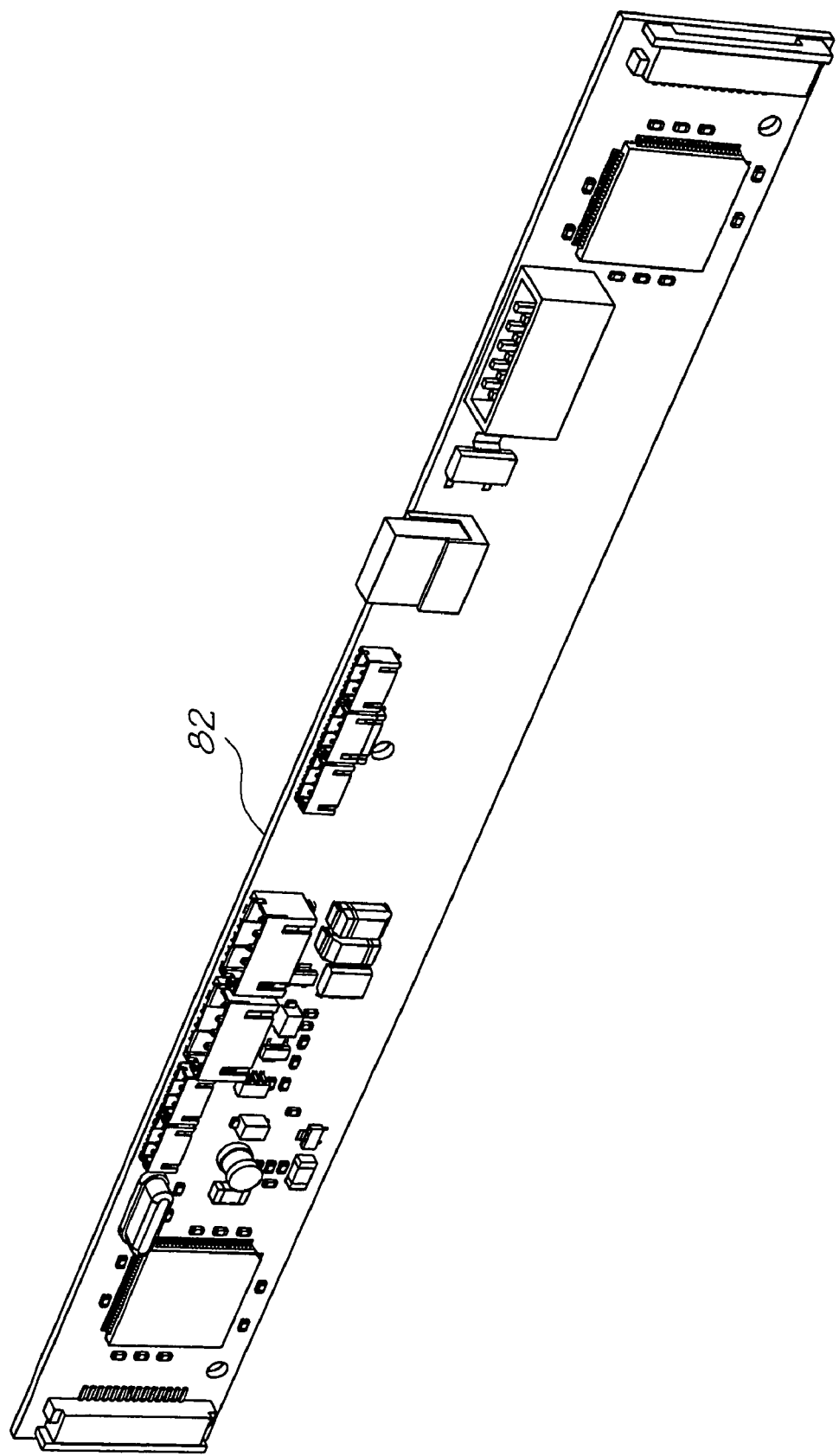
FIG. 33 is a perspective view of a twin SoPEC chip controller board.

In this regard, FIG. 32 shows the main PCB unit for a cradle unit operating at 15-30 ppm, whilst FIG. 33 shows a main PCB unit for driving a cartridge unit operating at 60 ppm. As can be seen the PCBs are almost identical with the main difference being the presence of 2 SoPEC chips on the 60 ppm PCB. Hence, even if a user has purchased a cradle unit which may not initially support a more powerful cartridge unit, the present system structure makes it easy for the cradle unit to be easily upgraded to support such systems.

The printer preferably also includes one or more system on a chip (SoC) components, as well as the print engine pipeline control application specific logic, configured to perform some or all of the functions described above in relation to the printing pipeline.

Figure 34:
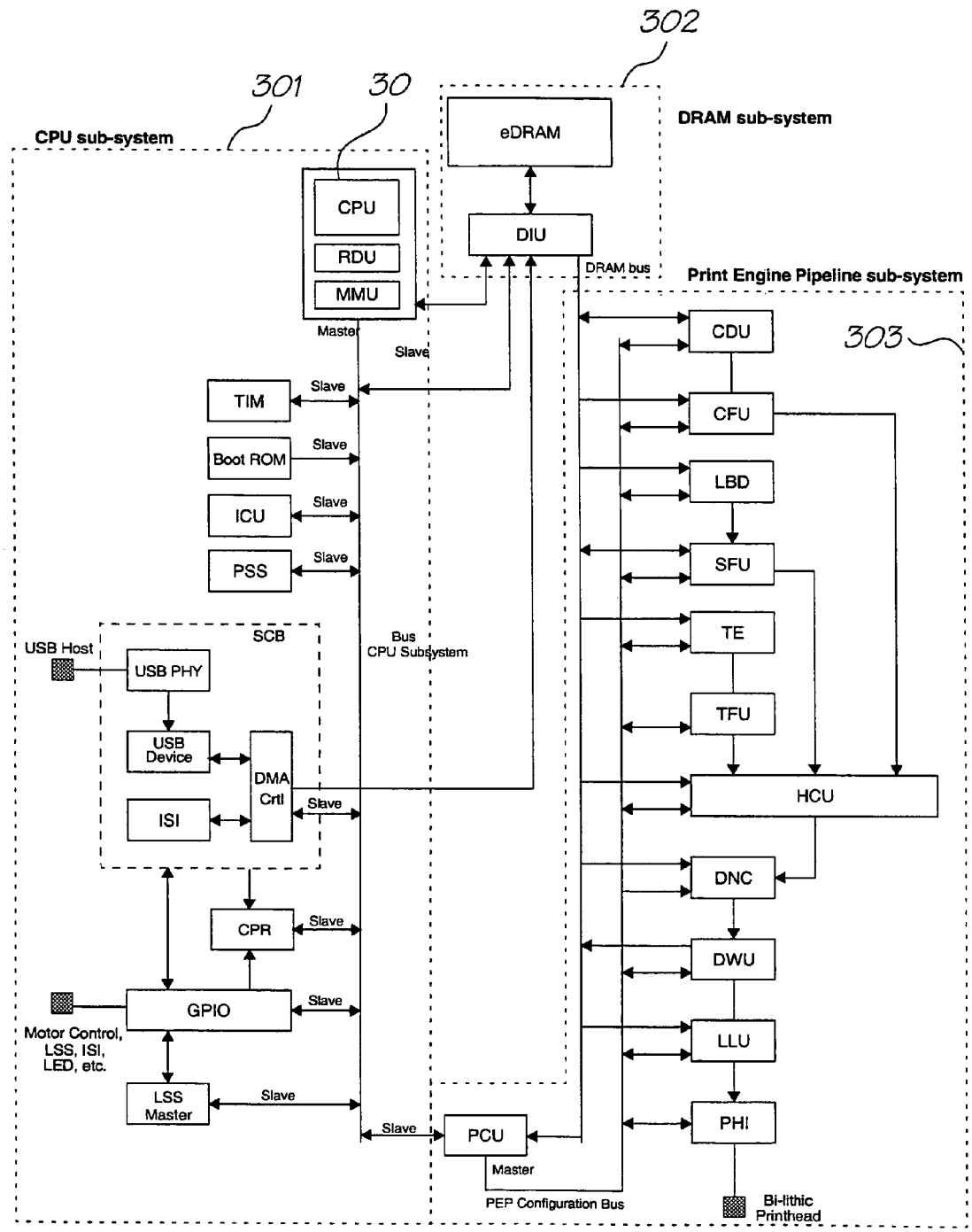
FIG. 34 is a block diagram of a SoPEC chip.
Figure 35:
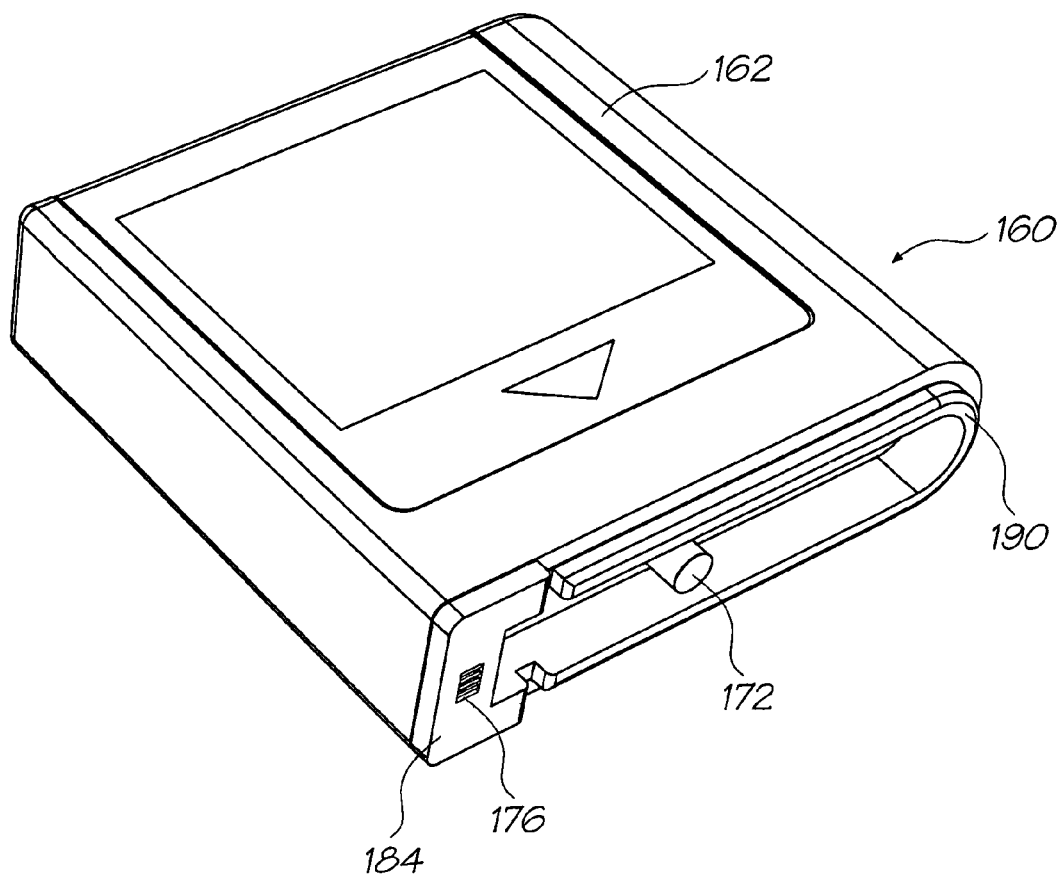
FIG. 35 is a perspective view of an ink refill cartridge in an emptied state.
Figure 36:
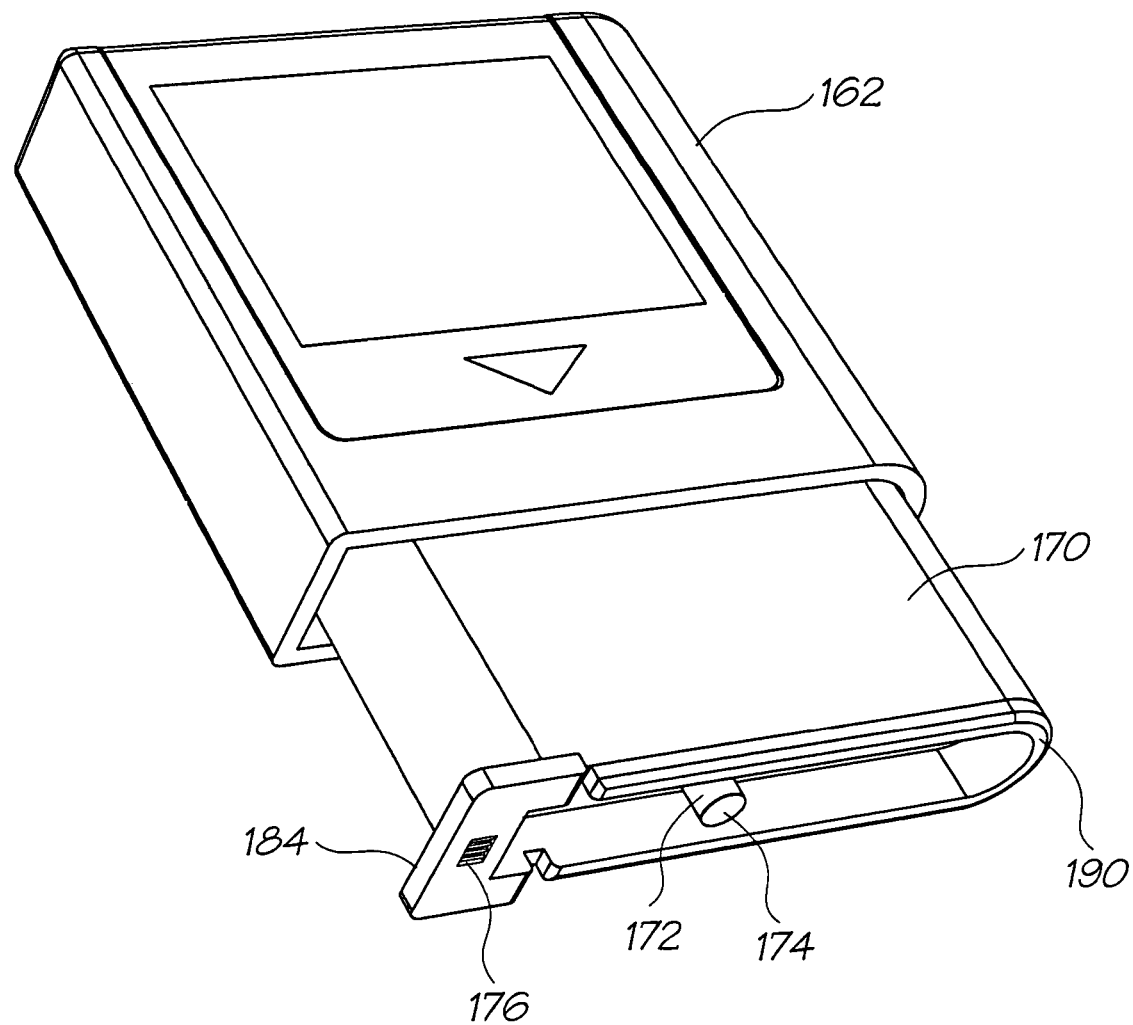
FIG. 36 is a perspective view of the ink refill cartridge in a full state.

Referring now to FIG. 34, from the highest point of view a SoPEC device consists of 3 distinct subsystems: a Central Processing Unit (CPU) subsystem 301, a Dynamic Random Access Memory (DRAM) subsystem 302 and a Print Engine Pipeline (PEP) subsystem 303.

The CPU subsystem 301 includes a CPU 30 that controls and configures all aspects of the other subsystems. It provides general support for interfacing and synchronizing the external printer with the internal print engine. It also controls the low-speed communication to QA chips (which are described elsewhere in this specification). The CPU subsystem 301 also contains various peripherals to aid the CPU, such as General Purpose Input Output (GPIO, which includes motor control), an Interrupt Controller Unit (ICU), LSS Master and general timers. The Serial Communications Block (SCB) on the CPU subsystem provides a full speed USB1.1 interface to the host as well as an Inter SoPEC Interface (ISI) to other SoPEC devices (not shown).

The DRAM subsystem 302 accepts requests from the CPU, Serial Communications Block (SCB) and blocks within the PEP subsystem. The DRAM subsystem 302, and in particular the DRAM Interface Unit (DIU), arbitrates the various requests and determines which request should win access to the DRAM. The DIU arbitrates based on configured parameters, to allow sufficient access to DRAM for all requesters. The DIU also hides the implementation specifics of the DRAM such as page size, number of banks and refresh rates.

The Print Engine Pipeline (PEP) subsystem 303 accepts compressed pages from DRAM and renders them to bi-level dots for a given print line destined for a printhead interface that communicates directly with up to 2 segments of a bi-lithic printhead. The first stage of the page expansion pipeline is the Contone Decoder Unit (CDU), Lossless Bi-level Decoder (LBD) and Tag Encoder (TE). The CDU expands the JPEG-compressed contone (typically CMYK) layers, the LBD expands the compressed bi-level layer (typically K), and the TE encodes Netpage tags for later rendering (typically in IR or K ink). The output from the first stage is a set of buffers: the Contone FIFO unit (CFU), the Spot FIFO Unit (SFU), and the Tag FIFO Unit (TFU). The CFU and SFU buffers are implemented in DRAM.

The second stage is the Halftone Compositor Unit (HCU), which dithers the contone layer and composites position tags and the bi-level spot layer over the resulting bi-level dithered layer.

A number of compositing options can be implemented, depending upon the printhead with which the SoPEC device is used. Up to 6 channels of bi-level data are produced from this stage, although not all channels may be present on the printhead. For example, the printhead may be CMY only, with K pushed into the CMY channels and IR ignored. Alternatively, the encoded tags may be printed in K if IR ink is not available (or for testing purposes).

In the third stage, a Dead Nozzle Compensator (DNC) compensates for dead nozzles in the printhead by color redundancy and error diffusing of dead nozzle data into surrounding dots.

The resultant bi-level 6 channel dot-data (typically CMYK, Infrared, Fixative) is buffered and written to a set of line buffers stored in DRAM via a Dotline Writer Unit (DWU).

Finally, the dot-data is loaded back from DRAM, and passed to the printhead interface via a dot FIFO. The dot FIFO accepts data from a Line Loader Unit (LLU) at the system clock rate (pclk), while the PrintHead Interface (PHI) removes data from the FIFO and sends it to the printhead at a rate of ⅔ times the system clock rate.

In the preferred form, the DRAM is 2.5 Mbytes in size, of which about 2 Mbytes are available for compressed page store data. A compressed page is received in two or more bands, with a number of bands stored in memory. As a band of the page is consumed by the PEP subsystem 303 for printing, a new band can be downloaded. The new band may be for the current page or the next page.

Using banding it is possible to begin printing a page before the complete compressed page is downloaded, but care must be taken to ensure that data is always available for printing or a buffer under-run may occur.

The embedded USB 1.1 device accepts compressed page data and control commands from the host PC, and facilitates the data transfer to either the DRAM (or to another SoPEC device in multi-SoPEC systems, as described below).

Multiple SoPEC devices can be used in alternative embodiments, and can perform different functions depending upon the particular implementation. For example, in some cases a SoPEC device can be used simply for its onboard DRAM, while another SoPEC device attends to the various decompression and formatting functions described above. This can reduce the chance of buffer under-run, which can happen in the event that the printer commences printing a page prior to all the data for that page being received and the rest of the data is not received in time. Adding an extra SoPEC device for its memory buffering capabilities doubles the amount of data that can be buffered, even if none of the other capabilities of the additional chip are utilized.

Each SoPEC system can have several quality assurance (QA) devices designed to cooperate with each other to ensure the quality of the printer mechanics, the quality of the ink supply so the printhead nozzles will not be damaged during prints, and the quality of the software to ensure printheads and mechanics are not damaged.

Normally, each printing SoPEC will have an associated printer QA, which stores information printer attributes such as maximum print speed. An ink cartridge for use with the system will also contain an ink QA chip, which stores cartridge information such as the amount of ink remaining. The printhead also has a QA chip, configured to act as a ROM (effectively as an EEPROM) that stores printhead-specific information such as dead nozzle mapping and printhead characteristics. The CPU in the SoPEC device can optionally load and run program code from a QA Chip that effectively acts as a serial EEPROM. Finally, the CPU in the SoPEC device runs a logical QA chip (ie, a software QA chip).

Usually, all QA chips in the system are physically identical, with only the contents of flash memory differentiating one from the other.

Each SoPEC device has two LSS system buses that can communicate with QA devices for system authentication and ink usage accounting. A large number of QA devices can be used per bus and their position in the system is unrestricted with the exception that printer QA and ink QA devices should be on separate LSS busses.

In use, the logical QA communicates with the ink QA to determine remaining ink. The reply from the ink QA is authenticated with reference to the printer QA. The verification from the printer QA is itself authenticated by the logical QA, thereby indirectly adding an additional authentication level to the reply from the ink QA.

Data passed between the QA chips, other than the printhead QA, is authenticated by way of digital signatures. In the preferred embodiment, HMAC-SHAI authentication is used for data, and RSA is used for program code, although other schemes could be used instead.

A single SoPEC device can control two bi-lithic printheads and up to six color channels. Six channels of colored ink are the expected maximum in a consumer SOHO, or office bi-lithic printing environment, and include:

CMY (cyan, magenta, yellow), for regular color printing.
K (black), for black text, line graphics and gray-scale printing.
IR (infrared), for Netpage-enabled applications.
F (fixative), to prevent smudging of prints thereby enabling printing at high speed.

Because the bi-lithic printer is capable of printing so fast, a fixative may be required to enable the ink to dry before the page touches the page already printed. Otherwise ink may bleed between pages. In relatively low-speed printing environments the fixative may not be required.

In the preferred form, the SoPEC device is color space agnostic. Although it can accept contone data as CMYX or RGBX, where X is an optional 4th channel, it also can accept contone data in any print color space. Additionally, SoPEC provides a mechanism for arbitrary mapping of input channels to output channels, including combining dots for ink optimization and generation of channels based on any number of other channels. However, inputs are typically CMYK for contone input, K for the bi-level input, and the optional Netpage tag dots are typically rendered to an infrared layer. A fixative channel is typically generated for fast printing applications.

In the preferred form, the SoPEC device is also resolution agnostic. It merely provides a mapping between input resolutions and output resolutions by means of scale factors. The expected output resolution for the preferred embodiment is 1600 dpi, but SoPEC actually has no knowledge of the physical resolution of the Bi-lithic printhead.

In the preferred form, the SoPEC device is page-length agnostic. Successive pages are typically split into bands and downloaded into the page store as each band of information is consumed.

| Subsystem | Unit Acronym | Unit Name | Description |
| --- | --- | --- | --- |
| DRAM | DIU | DRAM interface unit | Provides interface for DRAM read and write access for the various SoPEC units, CPU and the SCB block. The DIU provides arbitration between competing units and controls DRAM access. |
|  | DRAM | Embedded DRAM | 20 Mbits of embedded DRAM. |
| CPU | CPU | Central Processing Unit | CPU for system configuration and control. |
|  | MMU | Memory Management Unit | Limits access to certain memory address areas in CPU user mode. |
|  | RDU | Real-time Debug Unit | Facilitates the observation of the contents of most of the CPU addressable registers in SoPEC, in addition to some pseudo-registers in real time. |
|  | TIM | General Timer | Contains watchdog and general system timers. |
|  | LSS | Low Speed Serial Interfaces | Low level controller for interfacing with the QA chips |
|  | GPIO | General Purpose IOs | General IO controller, with built-in Motor control unit, LED pulse units and de-glitch circuitry |
|  | ROM | Boot ROM | 16 KBytes of System Boot ROM code |
|  | ICU | Interrupt Controller Unit | General Purpose interrupt controller with configurable priority, and masking. |

| Subsystem | Unit Acronym | Unit Name | Description |
| --- | --- | --- | --- |
| | CPR | Clock, Power and Reset block | Central Unit for controlling and generating the system clocks and resets and powerdown mechanisms |
| | PSS | Power Save Storage | Storage retained while system is powered down |
| | USB | Universal Serial Bus Device | USB device controller for interfacing with the host USB. |
| | ISI | Inter-SoPEC Interface | ISI controller for data and control communication with other SoPECs in a multi-SoPEC system |
| | SCB | Serial Communication Block | Contains both the USB and ISI blocks. |
| Print Engine Pipeline (PEP) | PCU | PEP controller | Provides external CPU with the means to read and write PEP Unit registers, and read and write DRAM in single 32-bit chunks. |
| | CDU | Contone Decoder Unit | Expands JPEG compressed contone layer and writes decompressed contone to DRAM |
| | CFU | Contone FIFO Unit | Provides line buffering between CDU and HCU |
| | LBD | Lossless Bi-level Decoder | Expands compressed bi-level layer. |
| | SFU | Spot FIFO Unit | Provides line buffering between LBD and HCU |
| | TE | Tag Encoder | Encodes tag data into line of tag dots. |
| | TFU | Tag FIFO Unit | Provides tag data storage between TE and HCU |
| | HCU | Halftoner Compositor Unit | Dithers contone layer and composites the bi-level spot and position tag dots. |
| | DNC | Dead Nozzle Compensator | Compensates for dead nozzles by color redundancy and error diffusing dead nozzle data into surrounding dots. |
| | DWU | Dotline Writer Unit | Writes out the 6 channels of dot data for a given printline to the line store DRAM |
| | LLU | Line Loader Unit | Reads the expanded page image from line store, formatting the data appropriately for the bi-lithic printhead. |
| | PHI | PrintHead Interface | Responsible for sending dot data to the bi-lithic printheads and for providing line synchronization between multiple SoPECs. Also provides test interface to printhead such as temperature monitoring and Dead Nozzle Identification. |

Ink Refill Cartridge

As previously explained, printhead cartridge 6 includes an ink storage membrane 26 that contains internal ink reservoirs 28-34 that are connected to an ink refill port 8 formed in the top of cover molding 36. In order to refill reservoirs 28-34 an ink dispenser in the form of an ink refill cartridge is provided as shown in FIGS. 35 to 42. The structure of refill cartridge 160 will be explained primarily with reference to FIG. 37 being an exploded view of the cartridge.

Ink cartridge 160 has an outer molding 162 which acts as an operation handle or "plunger" and which contains an internal spring assembly 164. Spring assembly 164 includes a platform 178 from which spring members 180 extend to abut the inside of cover molding 162. The spring members bias platform 178 against a deformable ink membrane 166 that is typically made of polyethylene and contains a printing fluid, for example a colored ink or fixative. Ink membrane 166 is housed within a polyethylene base molding 170 that slides within outer molding 162, as can be most readily seen in FIGS. 38 and 39. An ink outlet pipe 182 extends from membrane 166 and fits within an elastomeric collar 172 formed in the bottom of base molding 170. A seal 174 covers collar 172 prior to use of the ink refill cartridge.

At the bottom of base molding 170 there extends a lug 190, which acts as a locating feature, shaped to mate with refill port of an inkjet printer component such as the ink refill port 8 of printer cartridge 6. The position of outlet pipe 182 and collar 172 relative to lug 190 is varied depending on the type of printing fluid which the ink refill cartridge is intended to contain. Accordingly, a printing fluid system is provided comprising a number of printing fluid dispensers each having an outlet positioned relative to lug 190 depending upon the type of printing fluid contained within the dispenser. As a result, upon mating the refill cartridge to port 8, outlet 182 mates with the appropriate inlet 42A-42E and hence refills the particular storage reservoir 28, 30, 32, 34 dedicated to storing the same type of printing fluid.

Extending from one side of the bottom of base molding 170 is a flange 184 to which an authentication means in the form of quality assurance (QA) chip 176 is mounted. Upon inserting ink cartridge 160 into ink refill port 8, QA chip 176 is brought into contact with QA chip contact 132 located on cradle 4.

Figure 37:
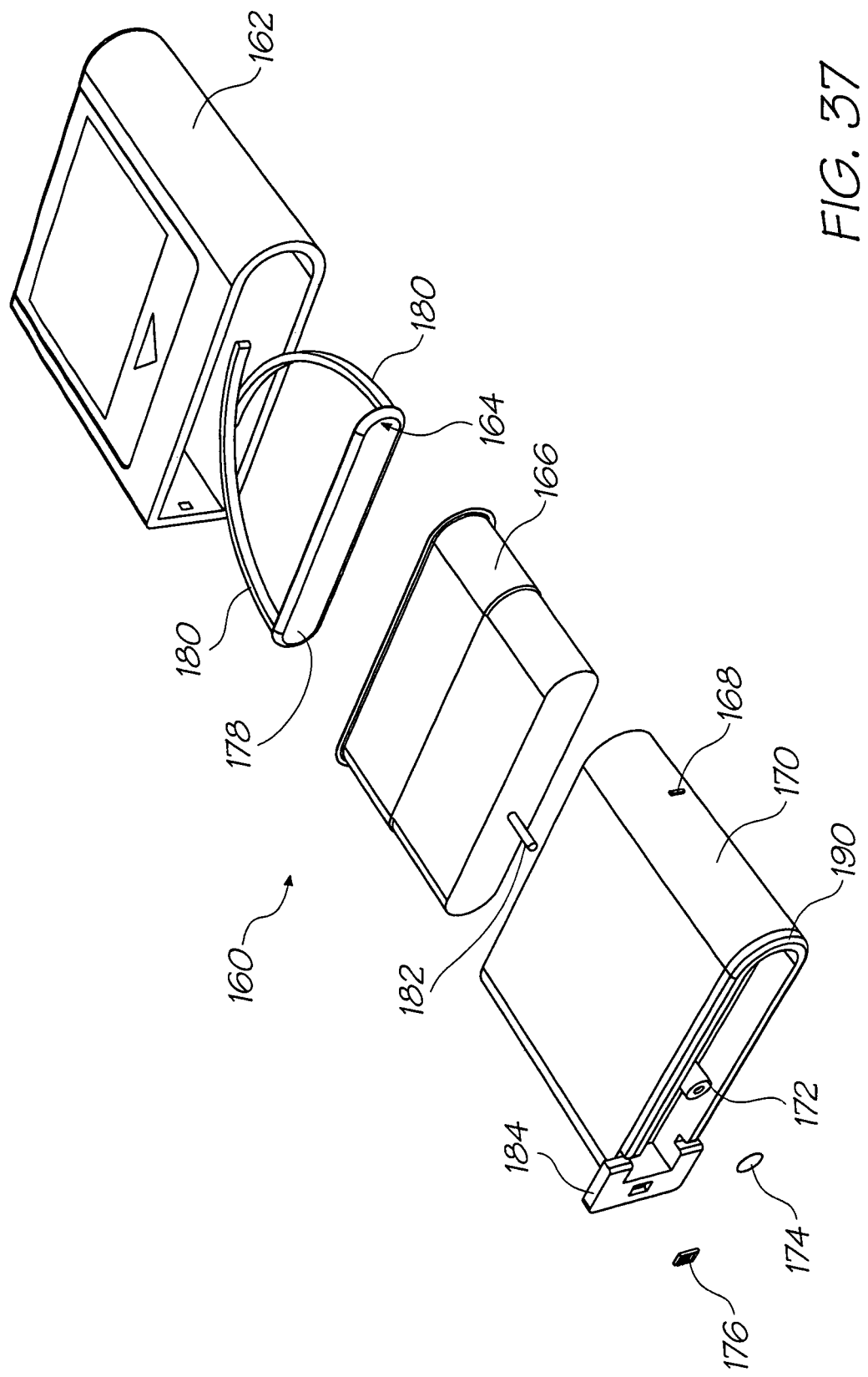
FIG. 37 is a perspective view of the ink refill cartridge in an exploded state.
Figure 38:
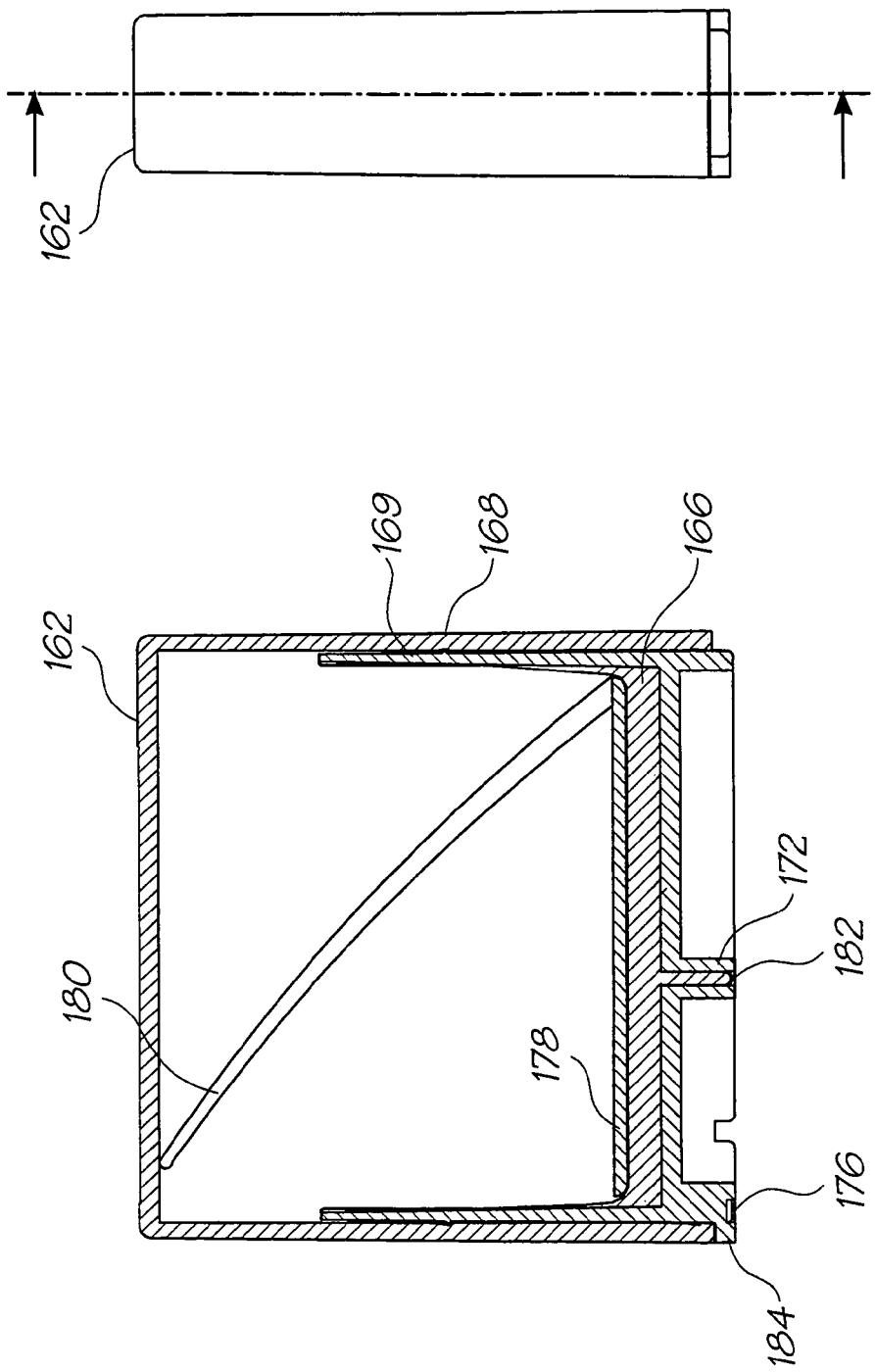
FIG. 38 is a cross section of the ink refill cartridge in an emptied state.

From the outside wall of base molding 170 there extends a retaining protrusion 168 that is received into an indentation being either pre-plunge recess 165 or post-plunge recess 169, both of which are formed around the inner wall of top cover molding 162 as shown in FIGS. 37 and 38. Pre-plunge recess 165 is located close to the opening of the top-cover molding whereas post-plunge recess 169 is located further up the inner wall. When ink cartridge 160 is fully charged, retaining protrusion 168 is engaged by pre-plunge recess 165. As will be more fully explained shortly, in order to overcome the engagement a deliberate plunging force, exceeding a predetermined threshold, must be applied to the top cover molding. Plunging discharges the ink through outlet 172, and overcomes the bias of spring assembly 164 so that base molding 170 is urged into top cover molding 162 until retaining protrusion 168 is received into post-plunge recess 169.

Example of Use

Figure 3:
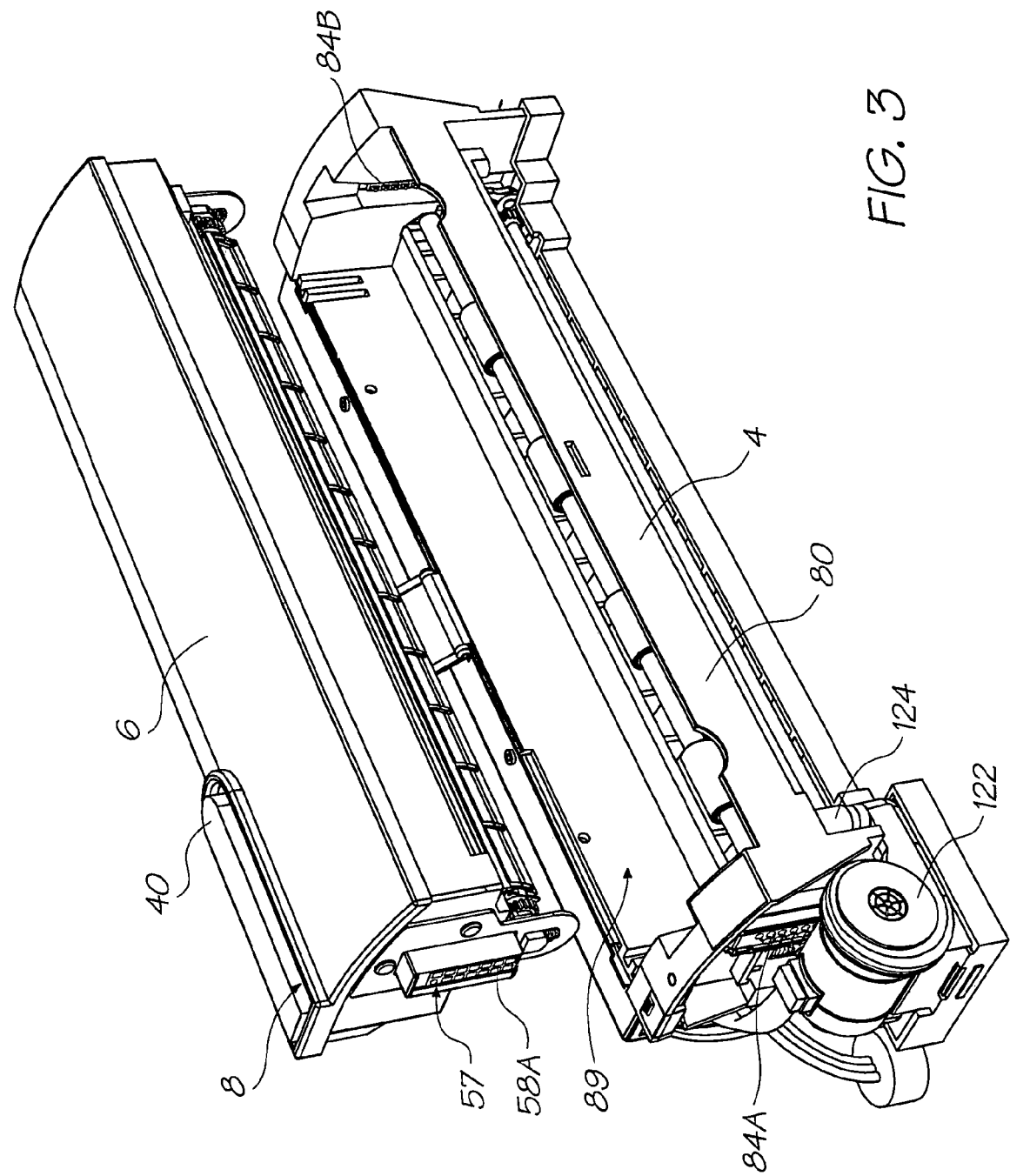
FIG. 3 is a perspective view, showing front, top and right-hand sides of the printer cartridge prior to insertion into the printer cradle.

In use printer cartridge 6 is correctly aligned above cradle 4 as shown in FIG. 3 and then inserted into recess 89 of upper cradle molding 80. As the cartridge unit is inserted into cradle 4, data and power contacts 84A and 84B on the cradle electrically connect with data and power contacts 58A and 58B of cartridge 6. Simultaneously air nozzle 124 of air compressor assembly 122 penetrates air seal 44 and enters air inlet port 76 of cartridge 6.

As can be seen in FIG. 27, the inner walls of recess 89 form a seat or shelf upon which cartridge 6 rests after insertion. A number of resilient members in the form of springs 91 are provided to act against the cartridge as it is brought into position and also against the retainer catch, as it is locked over the cartridge. Consequently the springs act to absorb shocks during insertion and then to hold the cartridge fast with the cradle 4 and latch 7 by securely biasing the cartridge in place against the latch. In an alternative the springs might instead be located on latch 7 in which case cartridge 6 would be biased against cradle 4.

Any attempt to insert the cartridge the wrong way around will fail due to the presence of orientating slots 86 and ribs 78 of cradle 4 and cartridge 6. Similarly, a cartridge that is not intended for use with the cradle will not have ribs corresponding to orientating slots 86 and so will not be received irrespective of orientation. In particular, a cartridge that requires driving by a cradle having a twin SoPEC chip controller board will not have the correct rib configuration to be received by a cradle having a single SoPEC chip controller board.

When the cartridge unit is first inserted into cradle unit 4, and during transportation, rotor element 60 is orientated so that its capping face engages printhead 52 thereby sealing the nozzle apertures of the printhead. Similarly, when the printer unit is not in use the capping surface is also brought into contact with the bottom of printhead 52 in order to seal it. Sealing the printhead reduces evaporation of the ink solvent, which is usually water, and so reduces drying of the ink on the print nozzles while the printer is not in use.

A remote computational device, such as a digital camera or personal computer, is connected to USB port 130 in order to provide power and print data signals to cradle 4. In response to the provision of power, the processing circuitry of controller board 82 performs various initialization routines including: verifying the manufacturer codes stored in QA chip 57; checking the state of ink reservoirs 28-34 by means of the ink reservoir sensor (not shown); checking the state of rotor element 60 by means of sensor 156; checking by means of paper sensor 192 whether or not paper or other print media has been inserted into the cradle; and tricolor indicator LED 135 to externally indicate, via lightpipe 136, the status of the unit.

Prior to carrying out a printing operation a piece of paper, or other print media, must be introduced into cradle 4. Upon receiving a signal to commence printing from the external computational device, controller board 82 checks for the presence of the paper by means of paper sensor 192. If the paper is missing then tricolor LED 135 is set to indicate that attention is required and the controller does not attempt to commence printing. Alternatively, if paper sensor 192 indicates the presence of a print media then controller board 82 responds by rotating rotor element 60 to a predetermined position for printing.

In this regard, upon detection of a printing mode of operation at start-up or during a maintenance routine, rotor element 60 is rotated so that its blotting face is located in the ink ejection path of printhead 52. The blotting surface can then act as a type of spittoon to receive ink from the print nozzles, with the ink received ink being drawn into the body of rotor element 60 due to the absorbent nature of the material provided on the blotting surface. Since rotor element 60 is part of the printer cartridge 6, the rotor element is replaced at the time of replacing the cartridge thereby ensuring that the blotting surface does not fill with ink and become messy.

Subsequent to detecting a print command at USB port 130 and confirming the presence of print media, controller board 82 drives motor 110 so that drive roller 96 begins to rotate and, in cooperation with pinch roller 98, draws the print media past printhead 52. Simultaneously, controller board 82 processes print data from the external computational device in order to generate control signals for printhead 52. The control signals are applied to the printhead via cradle interfaces 84A, 84B, carriage interfaces 58A, 58B and flex PCB contacts at either end of printhead chip 52. Printhead chip 52 is bilithic, i.e. has two elongate chips that extend the length of the printhead, data is provided at either end of the printhead where it is transferred along the length of each chip length of each chip to each individual nozzle. Power is to each individual nozzle. Power is provided to the individual nozzles of the printhead chips via the busbars that extend along the length of the chips. In response to received data and power, the individual nozzles of the printhead selectively eject ink onto the print media as it is drawn over the platen face of rotor element 60 thereby printing the image encoded in the data signal transmitted to USB port 130.

Operation of motor 110 causes air compressor 122 to direct air into the cartridge base molding. The air is channeled via fluid delivery paths in cartridge base molding 20 into the space behind air filter 51. Upon the air pressure building up to a sufficient level to overcome the resistance of the air filter 51, air is directed out through pores in air filter 51 along the length of the bottom of the cartridge base molding. The directed air is received between printhead chip 52 and air coverplate 54 whilst the printer is operating and is directed past the printhead chip surface, thereby serving to prevent degradation of the printhead by keeping it free of dust and debris.

Figure 40:
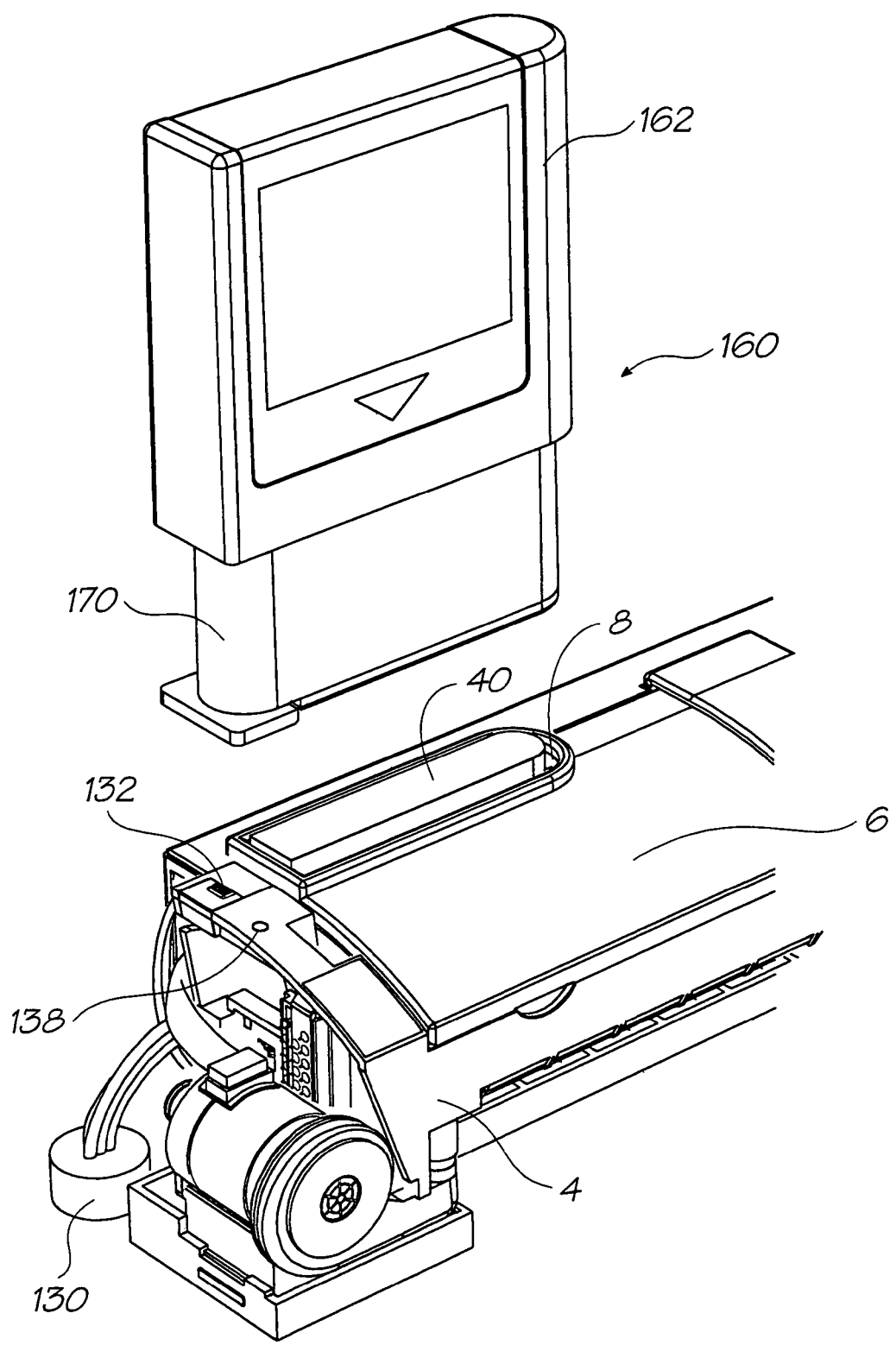
FIG. 40 depicts a full ink refill cartridge aligned for docking to a printer cartridge.

Referring now to FIG. 40, the first step of the ink refilling procedure is initiated by refill sensor (not shown) indicating to controller board 82 that there is a deficiency of printing fluid in storage reservoirs 28, 30, 32, 34. In response to the signal from the ink cartridge QA chip that the ink is nearly depleted, controller board 82 activates indicator LED 138 to inform the user that another refill is necessary. Alternatively, the detection of whether there is a deficiency of printing ink might instead be calculated by the electronics of the controller board. As the volume of ink per nozzle injection is known and is consistent throughout the operation of the printhead (approximately 1 picolitre) the amount of ink delivered by the printhead can be calculated as well as the consumption of each color or type of ink. In this regard controller board 82 is able to monitor the consumption of each printing fluid and once this level has reached a predetermined level, the tricolor indicator LED can be asserted to indicate to a user that there is a need to replenish the printing fluids.

Light from the indicator LED is transmitted by lightpipe 136 in order for an external indication to be presented to an operator of the printer at indicator port 138 of cradle 4. This indication can convey to the user the color or type of ink that requires replenishing. The controller board can also send a signal via USB port 130 to the remote computational device to display to the user via the computational device the type of ink that requires replenishment.

In order for the refilling procedure to proceed, printer cartridge 6 must be in place in printer cradle 4. An ink refill cartridge 160 of the required type of ink is then brought into position over the ink refill port 8 that is situated on the upper surface of printer cartridge 6. As previously described, ink refill port 8 includes a series of inlets 42A-42E protected by a sealing film 40. Beneath sealing film 40 there are located a number of printing fluid conduits 42A-42E which provide direct access to ink storage reservoirs 28, 30, 32, 34. An ink inlet is provided for each of the printing fluids, namely C, M, Y, K and Infrared and fixative where required. The position of the inlet for each of the different fluids is strategically placed laterally along inlet port 8 so that the ink outlet pin 182 of refill cartridge 160 automatically aligns and communicates with the particular one of inlets 42A-42E for the specific printing fluid that cartridge 160 contains and which is to be is to be replenished.

Figure 41:
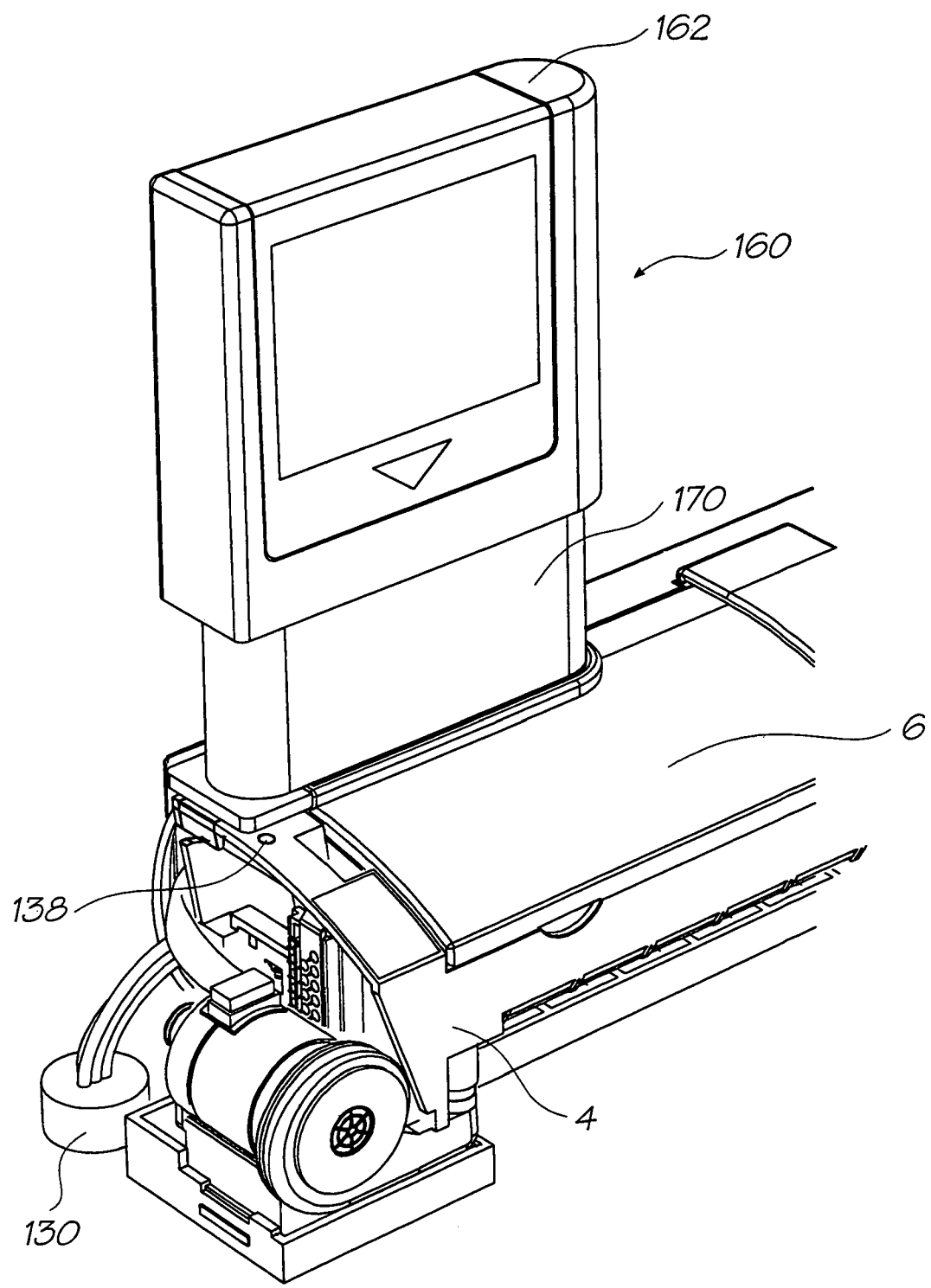
FIG. 41 depicts the ink refill cartridge docked to a printer cartridge prior to dispensing ink.

The second step of the ink refilling stage is shown in FIG. 41. In this figure, refill cartridge 160 has been docked into refill port 8 in the cartridge unit. Upon docking of refill cartridge 160 into refill port 8, ink refill QA chip 176 automatically aligns with QA contact 132 on the cradle unit. Controller board 82 interrogates the various codes stored in QA chip 176 in order to verify the integrity and authenticity of ink refill cartridge 160. If controller board 82 determines that QA chip 176 verifies the presence of authentic ink, namely from the appropriate manufacturer and of the required color or type, then it sets indicator LED 135 to show yellow, thereby indicating that refill cartridge 160 is accepted. Alternatively, controller board 82 may determine that an error state exists and in response set LED 135 to red in order to indicate that there is a problem with the refill cartridge. For example, an error state may be determined to exist if QA chip 176 failed to pass the verification step. Furthermore, it will often be the case that only one of reservoirs 28, 30, 32, 34 is in need of replenishment. For example, a reservoir that is assigned to store cyan colored ink may require refilling. In that case, should QA chip 176 indicates that ink refill cartridge 160 contains non-cyan ink then controller board 82 will set indicator LED 135 to red in order to flag an error state.

It will be realized that in order for a QA assured refill to occur, communication between all parts of the printer unit is required. That is, printer cartridge 6 must be positioned in printer cradle 4 and ink refill cartridge 160 must be docked with cartridge 6 so that ink refill QA chip 176 is in contact with ink QA chip contact 132. This ensures that each refilling action is controlled and reduces the potential for incorrect refilling which may damage the working of the printer.

As shown in FIG. 41, when ink refill cartridge 160 is docked in refill port 8 of cartridge unit 6, ink outlet pin 182 (see FIG. 39) penetrates sealing film 40 and one of apertures 42A-42E of the refill port to communicate with a corresponding one of ink inlets 24. Ink inlet 24 is provided as an elastomeric molding so that penetration of ink seal 32, which is located over ink refill cartridge outlet pin 182, occurs automatically. As a consequence, self-sealing fluid communication is ensured between the ink stored in refill cartridge 160, ink delivery conduits 43A-43E and storage reservoirs 28-34. The self-sealing fluid communication results in a pressurised fluid flow of ink into one of reservoirs 28, 30, 32, 34 occurring upon outer molding 162 being depressed.

Figure 42:
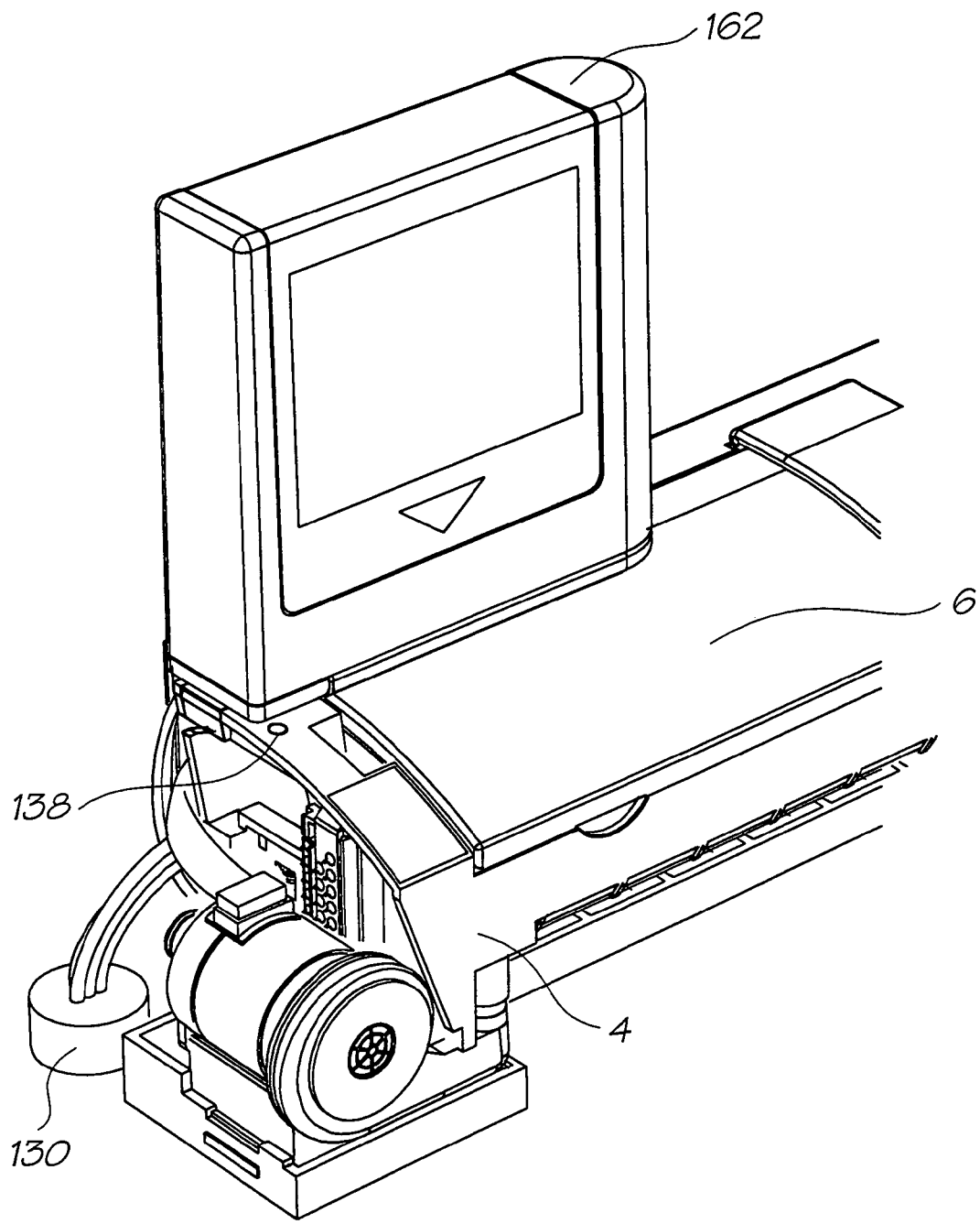
FIG. 42 depicts the ink refill cartridge docked to a printer cartridge subsequent to dispensing ink.

As shown in FIG. 42, the third stage of the ink refilling procedure occurs when top cover molding 162 is depressed thereby expelling the ink present within the ink refill cartridge 160 into one of printer cartridge reservoirs 28-34. Following depressing of outer molding 162 it is apparent to an operator that the ink refill cartridge 160 has been spent and can therefore be removed from printer cartridge 6 as the refill stage is now complete. Upon completion of the refill stage refill sensor (not shown) generates a signal indicating that the that the printing fluid level in each of reservoirs 28-34 is greater than a predetermined level. In response to the signal from the refill sensor, controller board 82 sets indicator LED 135 to shine green thereby indicating to the operator that the refill process has been successfully completed.

The force with which ink is expelled from ink refill cartridge 160 is determined by the degree of plunging force applied to the top cover molding 162 by an operator. Accordingly top cover molding 162 acts as an operation handle or plunger for the ink refill cartridge. Consequently it is possible that if the refilling step is not done carefully or done in haste, that the ink may be delivered to printer cartridge 6 at an unduly high pressure. Such a pressure could cause the ink stored within printer cartridge 6 to burst the ink storage membrane 26 and hence cause an ink spill within the cartridge unit that might irreparably damage the printer cartridge. The internal spring molding 164 prevents inadvertent bursting of the membrane by providing a safety mechanism against over pressurizing the ink being expelled from the refill unit. In this regard spring molding 164 is designed to limit the maximum force transmitted from the plunging of top cover molding 162 to deformable ink membrane 26. Any force applied to top cover molding 162 which would cause ink to be expelled at a pressure above a maximum allowable level is taken up by spring molding 164 and stored within the spring members 180. Spring molding 164 is suitably designed to prevent undue force being instantaneously applied to refill ink membrane 166. That is, its deformation and/or elastic characteristics are selected so that it limits pressure in the membrane to a predetermined level.

Figure 39:
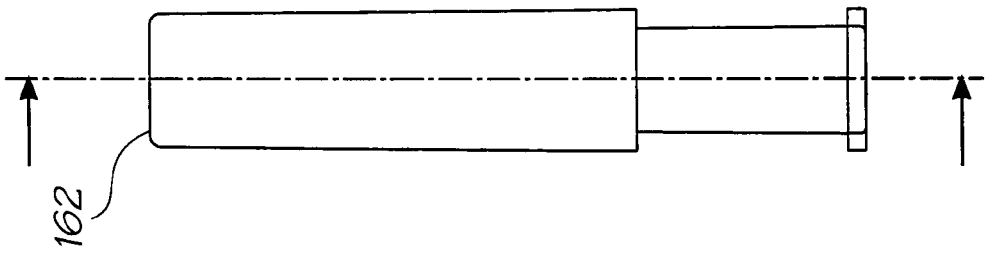
FIG. 39 is a cross section of the ink refill cartridge in a full state.
Figure 39:
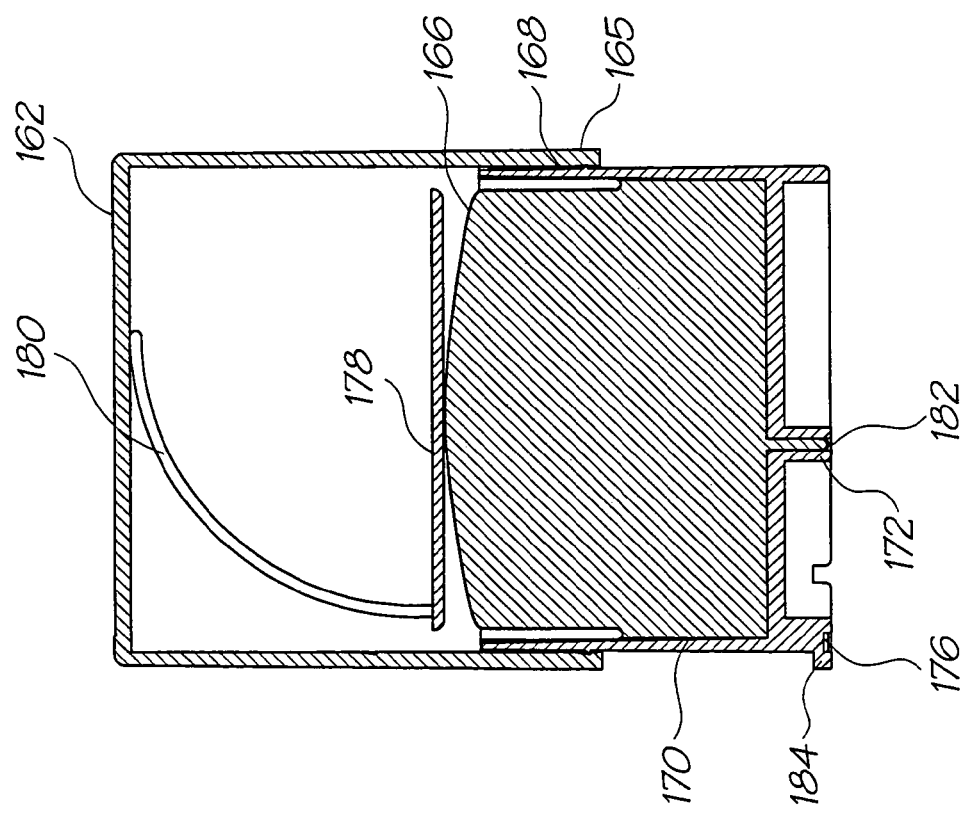

As shown most clearly in FIGS. 38 and 39 a retaining protrusion 168 is located on the side of base molding 170. Whilst ink cartridge 160 is in its pre-plunged state, retaining protrusion 168 mates with pre-plunge recess 165. Engagement of protrusion 168 with the pre-plunge recess provides an additional measure of security during the refill process. This is because the engagement prevents unintended forces being applied from the top cover molding onto the internal ink membrane 166 and so prevents inadvertent plunging of the top cover during transport or delivery. Subsequent to docking of ink refill cartridge 160 with refill port 8, top cover 162 is plunged with sufficient force to overcome the engagement of retaining protrusion 168 by pre-plunge recess 165. Plunging top cover molding 162 causes platform 178 of the spring assembly 164 against ink membrane 166 thereby expelling the ink through outlet pipe 182 and into printer cartridge ink reservoir membrane 166. In order to overcome the initial engagement of retaining protrusion 168, an initial high force may have to be applied. Spring member 164 momentarily acts to protect ink membrane 166 from being over pressurized for this instance. Following the initial application of force normal plunging proceeds. As shown in FIG. 38, upon completion of the refilling step, retaining protrusion 168 comes into engagement with a locking feature in the form of post-plunge recess 169 which is located towards the top of the inside wall of ink cartridge outer molding 169. Mating of retaining protrusion 168 with upper recess 169 locks ink cartridge outer molding 169 to base molding 170 subsequent to discharging of the ink. It will be realized that this arrangement overcomes the potential for a user to attempt to replenish ink refill cartridge 162 with an inferior ink which could cause damage to the nozzles of the printer cartridge as well as the ink refill cartridge. In its post-plunged configuration, the spent ink refill cartridge may be returned to a supplier. The supplier will be provided with a tool to unlock the refill cartridge and return the top cover to its upper position wherein authentic ink can be refilled into the refill unit for re-use and QA chip 176 reprogrammed to verify the authenticity of the ink.

It will, of course, be realized that the above has been given only by way of illustrative example of the invention and that all such modifications and variations thereto, as would be apparent to persons skilled in the art are deemed to fall within the broad scope and ambit of the invention as defined by the following claims.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

What is claimed is:

1. A cartridge for an inkjet printer that has a media feed path, the cartridge comprising:
    a casing that houses a printing fluid storage that defines an enclosed volume for holding a supply of printing fluid; and,
    a pagewidth printhead mounted to the casing in fluid communication with the printing fluid storage; wherein,
    the casing is configured for releasable engagement with the inkjet printer such that the casing and all the pagewidth printhead are simultaneously user removable and replaceable as a single component.

2. A printer cartridge according to claim 1, wherein the pagewidth printhead is arranged to generate a print of at least 8 inches in width.

3. A printer cartridge according to claim 1 wherein the printing fluid storage is housed within a body that includes an arrangement for replenishing of printing fluid from an external source.

4. A printer cartridge according to claim 1, wherein the pagewidth printhead includes at least 20,000 printing fluid delivery nozzles in fluid communication with the printing fluid storage.

5. A printer cartridge according to claim 4, wherein the pagewidth printhead includes at least 30,000 printing fluid delivery nozzles in fluid communication with the printing fluid storage.

6. A printer cartridge according to any of claims 2 to 5, or 1 wherein the printing fluid storage includes one or more storage reservoirs for storing an ink for printing.

7. A printer cartridge according to claim 6, wherein the one or more storage reservoirs separately store a set of colored inks sufficient for color printing.

8. A printer cartridge according to claim 7, wherein the one or more storage reservoirs also separately store an ink fixative to aid in fixing the ink delivered by the pagewidth printhead.

9. A printer cartridge according to claim 8, wherein the one or more storage reservoirs separately store an infra-red ink for printing.

10. A printer cartridge according to claim 9, further comprising an electrical connector in electrical communication with the pagewidth printhead, the electrical connector being disposed on the casing wherein the electrical connector has a first electrical connector disposed adjacent a first end of the pagewidth printhead and the corresponding connector in the inkjet printer has a first corresponding connector for mating with the first electrical connector when the casing engages the complementary recess.

11. A printer cartridge according to claim 10, wherein the electrical connector has a second electrical connector disposed adjacent a second end of the pagewidth printhead and the corresponding connector in the inkjet printer has a second corresponding connector of the inkjet printer for mating with the first electrical connector when the casing engages the complementary recess.

12. A printer cartridge according to claim 10 or 11, wherein printer power and data is transmitted to the pagewidth printhead from the inkjet printer by through the first and second electrical connectors.

13. A printer cartridge according to claim 12, wherein the cartridge includes an assembly arranged to direct air over said pagewidth printhead.

14. A printer cartridge according to claim 13, wherein the assembly includes a filter for filtering the air prior to said air being directed over said pagewidth printhead.

15. A printer cartridge according to claim 14, wherein the assembly includes an inlet for receiving air from an external source.

16. A printer cartridge according to claim 15, wherein the external source is located in the inkjet printer.

* * * * *